US009063931B2

(12) United States Patent
Wu

(10) Patent No.: US 9,063,931 B2
(45) Date of Patent: Jun. 23, 2015

(54) MULTIPLE LANGUAGE TRANSLATION SYSTEM

(76) Inventor: Ming-Yuan Wu, Taipei (TW)

(*) Notice: Subject to any disclaimer, the term of this patent is extended or adjusted under 35 U.S.C. 154(b) by 630 days.

(21) Appl. No.: 13/028,694

(22) Filed: Feb. 16, 2011

(65) Prior Publication Data

US 2012/0209588 A1 Aug. 16, 2012

(51) Int. Cl.
*G06F 17/28* (2006.01)

(52) U.S. Cl.
CPC .......... *G06F 17/2809* (2013.01); *G06F 17/289* (2013.01)

(58) Field of Classification Search
CPC ... G06F 17/271; G06F 17/274; G06F 17/275; G06F 17/277; G06F 17/289; G06F 17/2715; G06F 17/2735; G06F 17/2755; G06F 17/2785; G06F 17/2795; G06F 17/2818; G06F 17/2827; G06F 17/2836; G06F 17/2863; G06F 17/2872; G06F 9/4448
USPC ........................................................ 704/1–10
See application file for complete search history.

(56) References Cited

U.S. PATENT DOCUMENTS

| | | | | |
|---|---|---|---|---|
| 4,864,503 A * | 9/1989 | Tolin | | 704/2 |
| 4,991,094 A * | 2/1991 | Fagan et al. | | 704/9 |
| 5,418,717 A * | 5/1995 | Su et al. | | 704/9 |
| 5,587,903 A * | 12/1996 | Yale | | 704/9 |
| 5,677,835 A * | 10/1997 | Carbonell et al. | | 704/8 |
| 5,768,603 A * | 6/1998 | Brown et al. | | 704/9 |
| 5,793,869 A * | 8/1998 | Claflin, Jr. | | 380/269 |
| 5,890,103 A * | 3/1999 | Carus | | 704/9 |
| 6,233,545 B1 * | 5/2001 | Datig | | 704/2 |
| 6,275,789 B1 * | 8/2001 | Moser et al. | | 704/7 |
| 6,278,967 B1 * | 8/2001 | Akers et al. | | 704/2 |
| 6,393,389 B1 * | 5/2002 | Chanod et al. | | 704/7 |
| 6,658,627 B1 * | 12/2003 | Gallup et al. | | 715/236 |
| 6,937,974 B1 * | 8/2005 | d'Agostini | | 704/2 |
| 6,996,520 B2 * | 2/2006 | Levin | | 704/10 |
| 7,149,681 B2 * | 12/2006 | Hu et al. | | 704/2 |
| 7,212,964 B1 * | 5/2007 | Alshawi et al. | | 704/10 |
| 7,249,012 B2 * | 7/2007 | Moore | | 704/4 |
| 7,539,619 B1 * | 5/2009 | Seligman et al. | | 704/277 |

(Continued)

OTHER PUBLICATIONS

Adam Lopez, "Statistical Machine Translation," University of Edinburgh, Edinburgh, United Kingdom, Published in: Journal ACM Computing, vol. 40 Issue 3, Aug. 2008 Article No. 8.*

(Continued)

*Primary Examiner* — Pierre-Louis Desir
*Assistant Examiner* — Fariba Sirjani
(74) *Attorney, Agent, or Firm* — Muncy, Geissler, Olds & Lowe, P.C.

(57) ABSTRACT

A multiple language translation system is disclosed. A code stream that is transmitted between users comprises a language code indicating the language used, a sentence code indicating a sentence structure, and at least one word code. The word codes are codes representing a word in the language that the language code represents. Each word code comprises a number code representing a unique word and a grammar code indicating grammatical usage the word. During translation of the code stream, the sentence code is used to format the word codes or the words represented by the word codes in a correct sentence. The code stream is translated by identifying the language code and translating the word codes into a second language. The sentence code is then used to arrange the words of the second language into a grammatically correct sentence.

20 Claims, 25 Drawing Sheets

(56) References Cited

U.S. PATENT DOCUMENTS

| | | | |
|---|---|---|---|
| 7,577,561 B2* | 8/2009 | McEntee et al. | 704/4 |
| 7,672,829 B2* | 3/2010 | Ishikura | 704/2 |
| 7,716,038 B2* | 5/2010 | Flanagan et al. | 704/8 |
| 7,873,508 B2* | 1/2011 | Chino et al. | 704/2 |
| 7,921,018 B2* | 4/2011 | Hong et al. | 704/277 |
| 7,974,833 B2* | 7/2011 | Soricut et al. | 704/9 |
| 8,027,832 B2* | 9/2011 | Ramsey et al. | 704/9 |
| 8,041,018 B2* | 10/2011 | Wald et al. | 379/202.01 |
| 8,060,359 B2* | 11/2011 | Kimura | 704/4 |
| 8,195,447 B2* | 6/2012 | Anismovich et al. | 704/4 |
| 8,209,165 B2* | 6/2012 | Whitelock et al. | 704/2 |
| 8,214,196 B2* | 7/2012 | Yamada et al. | 704/2 |
| 8,239,207 B2* | 8/2012 | Seligman et al. | 704/277 |
| 8,265,924 B1* | 9/2012 | Cutler | 704/8 |
| 8,346,536 B2* | 1/2013 | Jiang et al. | 704/2 |
| 8,407,040 B2* | 3/2013 | Sata et al. | 704/2 |
| 8,731,901 B2* | 5/2014 | Srihari et al. | 704/2 |
| 8,762,128 B1* | 6/2014 | Brants et al. | 704/2 |
| 8,892,423 B1* | 11/2014 | Danielyan et al. | 704/10 |
| 8,914,395 B2* | 12/2014 | Jiang | 707/760 |
| 2002/0111789 A1* | 8/2002 | Hull | 704/4 |
| 2002/0152063 A1* | 10/2002 | Tokieda et al. | 704/2 |
| 2002/0198699 A1* | 12/2002 | Greene et al. | 704/2 |
| 2003/0171910 A1* | 9/2003 | Abir | 704/1 |
| 2003/0195746 A1* | 10/2003 | Amada et al. | 704/220 |
| 2005/0055217 A1* | 3/2005 | Sumita et al. | 704/277 |
| 2005/0216253 A1* | 9/2005 | Brockett | 704/5 |
| 2006/0184357 A1* | 8/2006 | Ramsey et al. | 704/9 |
| 2007/0038451 A1* | 2/2007 | Cogne et al. | 704/256 |
| 2007/0050306 A1* | 3/2007 | McQueen | 705/77 |
| 2007/0282592 A1* | 12/2007 | Huang et al. | 704/9 |
| 2008/0040095 A1* | 2/2008 | Sinha et al. | 704/2 |
| 2008/0208565 A1* | 8/2008 | Bisegna | 704/4 |
| 2009/0125295 A1* | 5/2009 | Drewes | 704/3 |
| 2009/0125497 A1* | 5/2009 | Jiang et al. | 707/4 |
| 2009/0177461 A1* | 7/2009 | Ehsani et al. | 704/2 |
| 2009/0187400 A1* | 7/2009 | Liu et al. | 704/8 |
| 2009/0204482 A1* | 8/2009 | Reshef et al. | 705/10 |
| 2009/0222256 A1* | 9/2009 | Kamatani et al. | 704/2 |
| 2009/0222409 A1* | 9/2009 | Peoples et al. | 707/3 |
| 2009/0287671 A1* | 11/2009 | Bennett | 707/4 |
| 2009/0307183 A1* | 12/2009 | Vigen | 707/1 |
| 2009/0319257 A1* | 12/2009 | Blume et al. | 704/7 |
| 2010/0161642 A1* | 6/2010 | Chen et al. | 707/759 |
| 2010/0250370 A1* | 9/2010 | Jones et al. | 705/14.66 |
| 2011/0046939 A1* | 2/2011 | Balasaygun | 704/2 |
| 2011/0125485 A1* | 5/2011 | Prakash et al. | 704/3 |
| 2011/0184718 A1* | 7/2011 | Chen | 704/2 |
| 2011/0270607 A1* | 11/2011 | Zuev | 704/9 |
| 2011/0320191 A1* | 12/2011 | Makeyev | 704/9 |
| 2012/0022853 A1* | 1/2012 | Ballinger et al. | 704/8 |
| 2012/0095993 A1* | 4/2012 | Shau | 707/723 |
| 2012/0209588 A1* | 8/2012 | Wu | 704/3 |
| 2012/0245920 A1* | 9/2012 | Wu | 704/3 |
| 2012/0303352 A1* | 11/2012 | Coen et al. | 704/2 |
| 2012/0330644 A1* | 12/2012 | Giraudy et al. | 704/3 |
| 2012/0330990 A1* | 12/2012 | Chen et al. | 707/761 |
| 2013/0041667 A1* | 2/2013 | Longe et al. | 704/251 |
| 2013/0144594 A1* | 6/2013 | Bangalore et al. | 704/2 |

OTHER PUBLICATIONS

Harold Somers, "Review Article: Example-Based Machine Translation," Machine Translation 14: 113-157, 1999.*

D. Yarowsky, "Word-Sense Disambiguation Using Critical Statistical Models of Reoget's Categories Trained on Large Corpora," in Proc. COLING92, Nantes, France (1992).*

* cited by examiner

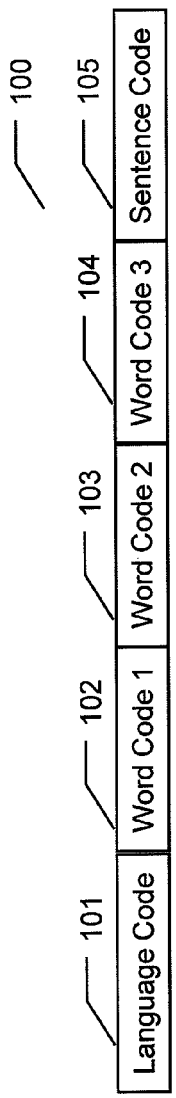
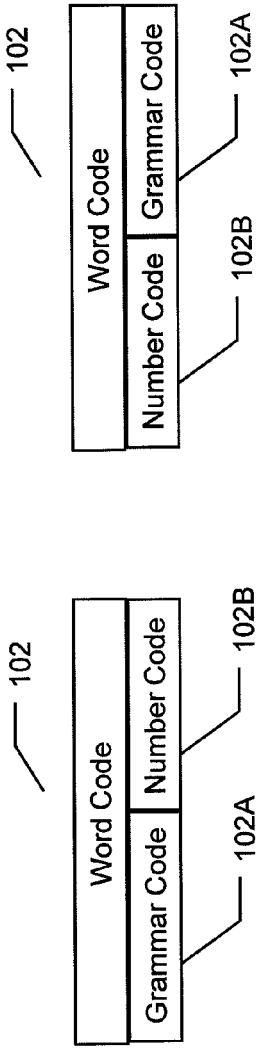
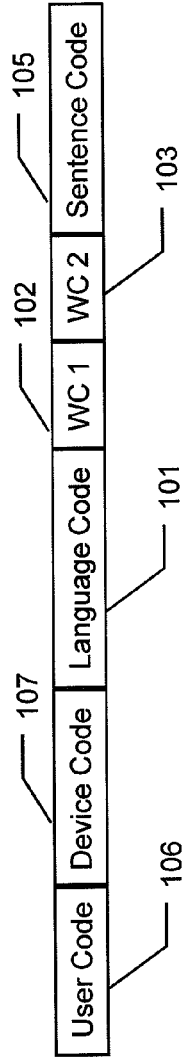
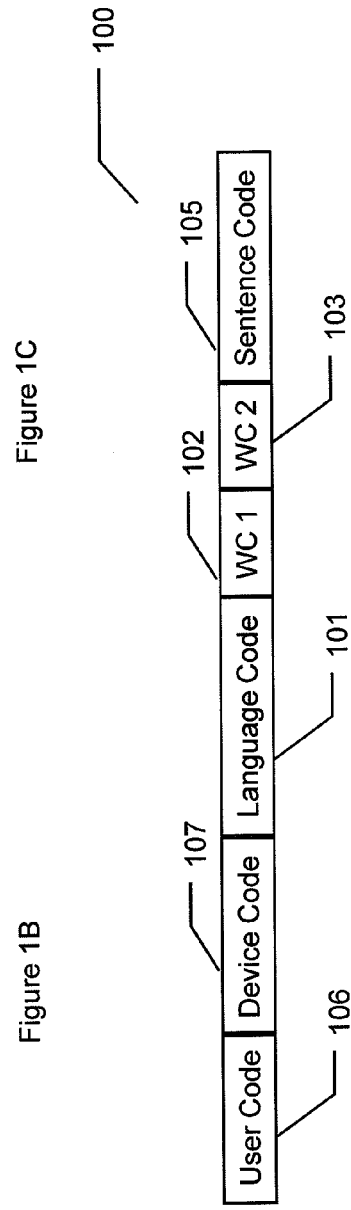
Figure 1A
Figure 1B
Figure 1C
Figure 1D

Figure 1E

| A | 1 | K | 11 | U | 21 |
| B | 2 | L | 12 | V | 22 |
| C | 3 | M | 13 | W | 23 |
| D | 4 | N | 14 | X | 24 |
| E | 5 | O | 15 | Y | 25 |
| F | 6 | P | 16 | Z | 26 |
| G | 7 | Q | 17 | | |
| H | 8 | R | 18 | | |
| I | 9 | S | 19 | | |
| J | 10 | T | 20 | | |

Figure 12A

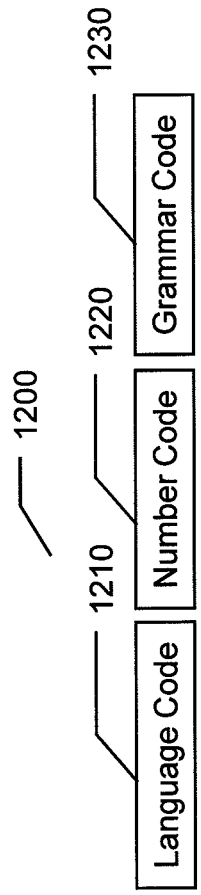
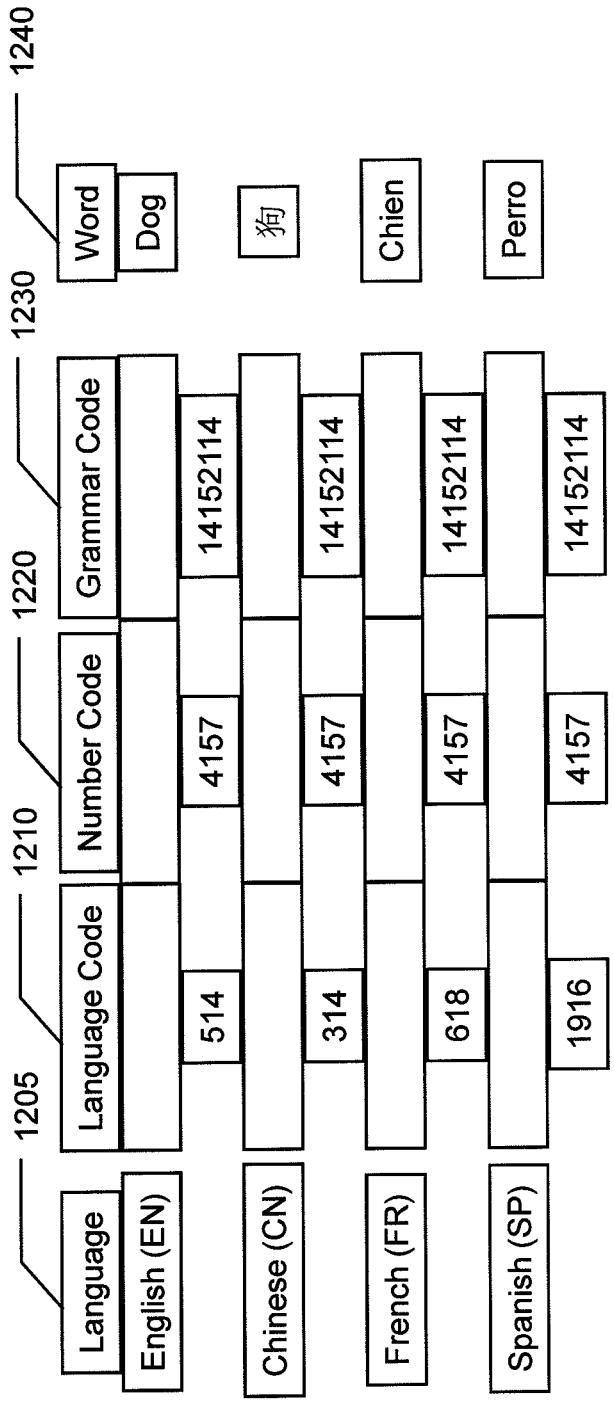
Figure 12B
Figure 12C

MULTIPLE LANGUAGE TRANSLATION SYSTEM

BACKGROUND OF THE INVENTION

1. Field of the Invention

The present invention relates to translation systems. More specifically, the present invention discloses a translation system for translation from a first language into at least one target language.

2. Description of the Prior Art

Since people throughout the world use various languages it is difficult for many people to communicate with each other unless they both know a common language. This leads to misunderstandings, conflicts, or isolation due to the language barrier.

In order to obtain better communication a human translator is often required to translate between two languages so that both parties can comprehend. However, employing a human translator can be expensive, ineffective, or inflexible.

Another common option for translation is using a computer for machine translation. Unfortunately, language rules in various languages can differ greatly. As a result the output from the machine translation is often incomprehensible rendering the method unreliable.

Therefore, there is need for an improved means of effectively and conveniently translating between user languages.

SUMMARY OF THE INVENTION

To achieve these and other advantages and in order to overcome the disadvantages of the conventional methods in accordance with the purpose of the invention as embodied and broadly described herein, the present invention provides a multiple language translation system that allows users to interact and communicate with each other using their own languages.

The multiple language translation system of the present invention comprises a code stream that is transmitted and received by users. The code stream comprises a language code, a sentence code, and at least one word code. The codes are, for example, a number in binary, hexadecimal, octal, etc.

The language code indicates the language used in the contents of the code stream.

The word codes are codes indicating or representing a word in the language that the language code represents. Each word code represents a unique word. Each word code comprises a grammar code and a number code. The number code is a code representing a unique word in the language used. The grammar code is a code representing the grammatical usage or grammatical characteristic of the word.

The sentence code is a code indicating a sentence structure for the word codes in the code stream. During translation of the code stream, the sentence code is used to format the word codes or the words represented by the word codes in a correct sentence.

The code stream is translated by identifying the language code and translating the word codes into a second language. The sentence code is then used to arrange the words of the second language into a grammatically correct sentence.

The multiple language translation system of the present invention comprises receiving an input from a first user in an original language. Next, the original language input is translated into text in a base language. The base language text is then converted into word code or word codes of a target language and the target language word or words are determined. The target language words are searched for over the internet or a server and the most popular, best choice, or most likely use translation is selected and sent to a user as a translation in the target language.

The multiple language translation system of the present invention can be utilized with text, voice, images, or scanned material. For example, in a chat room application a first user can type a sentence in one language and a second user can read the translated text in another language. Another application is situations when multiple users using multiple languages need translation but a human translator for each one is ineffective.

Another application of the multiple language translation system is in a telephone conversation or conference call. Each member of the conversation uses their native language and the translation is supplied to other users in their native language. This allows callers to use a language they are familiar with in order to hold a conversation with users of different languages.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 1A is a drawing illustrating a code stream of the multiple language translation system of the present invention according to an embodiment of the present invention;

FIGS. 1B-1C are drawings illustrating a word code structure of the multiple language translation system of the present invention according to an embodiment of the present invention;

FIG. 1D is a drawing illustrating a code stream of the multiple language translation system of the present invention according to an embodiment of the present invention;

FIG. 1E is a drawing illustrating relationships in word codes using multiple languages of the multiple language translation system according to an embodiment of the present invention;

FIG. 12A is a drawing illustrating a letter code system where letters in a base language are represented by numbers according to an embodiment of the present invention;

FIG. 12B is a drawing illustrating format of a word code according to an embodiment of the present invention; and FIG. 12C is a drawing illustrating a comparison of word codes for different languages according to an embodiment of the present invention.

DESCRIPTION OF THE PREFERRED EMBODIMENTS

Figure 2A:
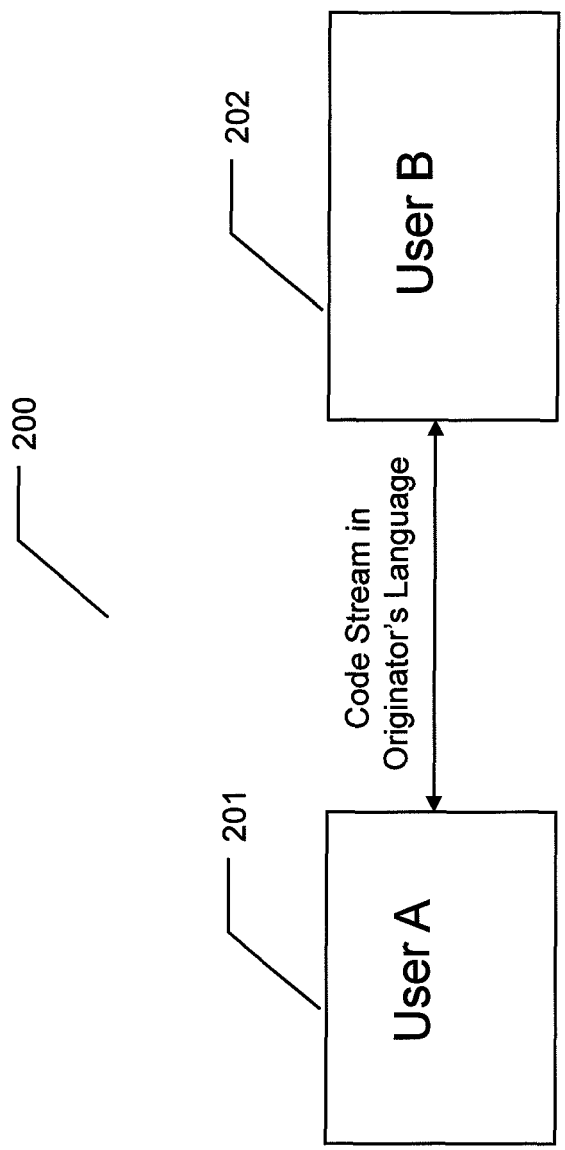
FIG. 2A is a drawing illustrating an architecture of the multiple language translation system of the present invention according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Figure 1E:
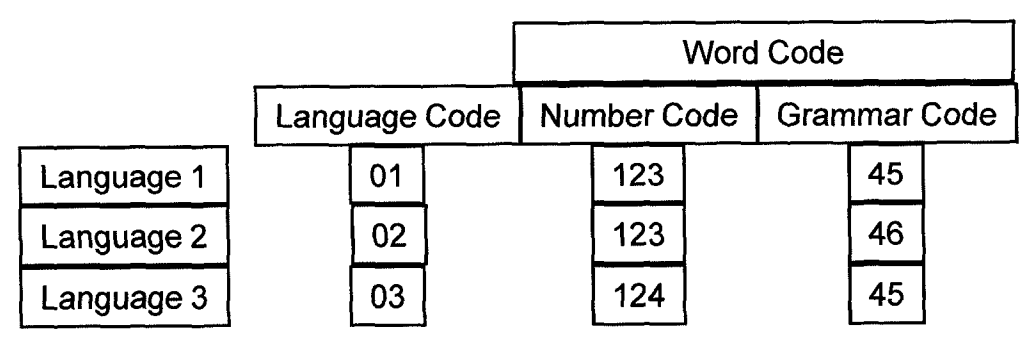

Refer to FIG. 1A, which is a drawing illustrating a code stream of the multiple language translation system of the present invention according to an embodiment of the present invention.

An important component of the multiple language translation system of the present invention is the code stream. As shown in FIG. 1A the code stream 100 comprises a number of elements. In this embodiment the code stream 100 comprises a language code 101, a first word code 102, a second word code 103, a third word code 104, and a sentence code 105.

The language code 101 comprises a code indicating or representing the language used in the word codes 102, 103, 104 and the sentence code 105. For example, if the user generating the code stream 100 is using English, the language code 101 would indicate that the word codes 102,103,104 represent English words.

The word codes 102,103,104 are codes indicating or representing a word in the language that the language code 101 represents. Each word code represents a unique word.

The sentence code 105 is a code indicating a sentence structure for the word codes 102,103,104 in the code stream 100. During translation of the code stream 100, the sentence code 105 is used to format the word codes into a correct sentence.

In embodiments of the present invention the position of the various codes in the code stream is different. For example, the sentence code is positioned or located in the code stream ahead of the word codes.

Refer to FIGS. 1B-1C, which are drawings illustrating a word code structure of the multiple language translation system of the present invention according to an embodiment of the present invention.

In the embodiment shown in FIGS. 1B and 1C each word code 102 comprises a grammar code 102A and a number code 102B. The number code 102B is a code representing a unique word in the language used. The grammar code 102A is a code representing the grammatical usage or grammatical characteristic of the word. For example, if the language code indicates the language used is English, and the number code represents the word "Rabbit", the grammar code would represent "Noun".

Another example is given as follows:

For the word "She" the grammar code for "Pronoun" could be "123" and the number code representing "She" could be "45";

For the word "He" the grammar code for "Pronoun" could be "123" and the number code representing "He" could be "46";

For the word "We" the grammar code for "Pronoun" could be "123" and the number code representing "We" could be "47".

Note in this example the grammar code in the three word codes is the same since the three words are all pronouns. However, each number code represents a unique word since the three words are different. Similarly, when a word has multiple grammatical uses the number code does not change but the grammar code changes. For example, the word "fly" can be a verb or a noun with the same spelling. Therefore the number code does not change but the grammar code changes.

Additionally, in cases where words are spelled the same and the grammatical usage of the words is the same, the number code further identifies the correct word. For example, the word "runs" could mean "to jog quickly", "to operate", "paint drips", and "run for office". As these are all verbs and the spelling is the same, the number code is different for each meaning.

As shown in FIGS. 1B and 1C the position in the word code 102 of the grammar code 102A and the number code 102B in various embodiments is different.

Refer to FIG. 1D, which is a drawing illustrating a code stream of the multiple language translation system of the present invention according to an embodiment of the present invention.

In the embodiment shown in FIG. 1D the code stream 100 further comprises a user code 106 and a device code 107. In an embodiment of the present invention the device code 107 indicates or identifies the device sending the code stream. In another embodiment of the present invention the device code 107 indicates or identifies the device intended to receive the code stream. In an embodiment of the present invention the user code 106 indicates or identifies the user sending the code stream. In another embodiment of the present invention the user code 106 indicates or identifies the user intended to receive the code stream. In some embodiments of the present invention only one, either the user code 106 or the device code 107, is used.

In another embodiment the user code 106 represents the language of the intended receiver. In this embodiment the user code represents the receiver's language and the language code represents the language used in the code stream.

Refer to FIG. 1E, which is a drawing illustrating relationships in word codes using multiple languages of the multiple language translation system according to an embodiment of the present invention.

In FIG. 1E three languages are shown along with example language codes and word codes. The language code representing language 1 is "01", the language code representing language 2 is "02", and the language code representing language 3 is "03".

The number code in the word code for language 1 is "123". The number code in the word code for language 2 is also "123" since it matches or is a directly relating word in both language 1 and language 2. However, the number code for language 3 is "124" since the word in language 3 is a slightly different word due to, for example, nuance, meaning, usage, grammar, or sentence structure.

The grammar code in the word code for language 1 and language 3 is "45" since the grammatical usage of the word matches or directly relates in both languages. However, the grammar code for language 2 is "46" since the grammatical usage is different from language 1. For example, the word may be a verb in all three languages, but the verb type is different in language 2.

Refer to FIG. 2A, which is a drawing illustrating an architecture of the multiple language translation system of the present invention according to an embodiment of the present invention.

In the embodiment illustrated in FIG. 2A the architecture 200 of the multiple language translation system comprises a User A device 201 and a User B device 202. the User A device 201 and the User B device 202 comprise, for example, computers, mobile telephones, headsets, loudspeakers, or other electronic devices capable of transmitting or receiving analog or digital signals. In an embodiment of the present invention the communication link between User A device and User B device is unidirectional. In another embodiment the communication link is bidirectional to allow both users to communicate with each other.

In the embodiment illustrated in FIG. 2A the code stream is sent in the originator's language. In this embodiment translation of the code stream is performed by the receiving device. This allows one code stream to be sent to multiple user devices and the code stream is translated into the receiving user's preferred language.

As an example, the following is given:
User A transmits the following sentence encoded in a code stream. The original sentence is "gen wo hwei jia". The language used is Chinese and is indicated by the language code "05". The word codes are "22" (gen), "33" (wo), "44" (hwei), and "55" (jia). The sentence code is "66". Therefore, the original code stream would comprise "05+22+33+44+55+66".

User B receives the original code stream and detects the language code "05". User's B device then translates the word codes from Chinese into User B's preferred language, for example, English. The word codes "22+33+44+55" in Chinese become the following word codes in English "26" (with), "36" (me), "46" (come), and "56" (home). Obviously, "with me come home" is not correct. User B's device converts the sentence code "66" in the original code screen and formats the translated words into the grammatically correct sentence "come home with me".

Figure 2B:
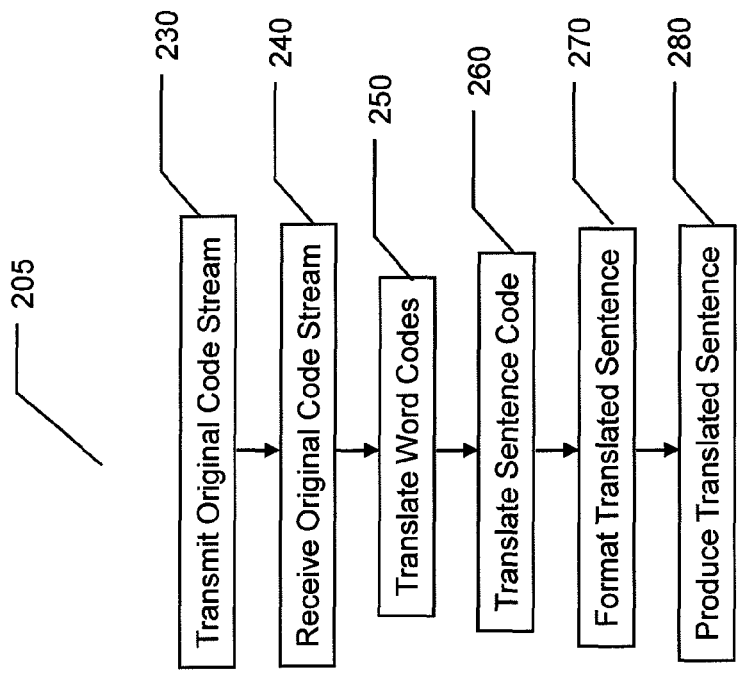
FIGS. 2B-2C are flowcharts illustrating methods of the multiple language translation system of the present invention according to an embodiment of the present invention.

Refer to FIG. 2B, which is a flowchart illustrating a method of the multiple language translation system of the present invention according to an embodiment of the present invention.

The method 205 is an embodiment utilizing the architecture illustrated in FIG. 2A. The method 205 begins by transmitting the original code stream created by a user (User A or User B) in Step 230. In Step 240 the other user receives the original code stream. Then, in Step 250 the user's device translates the word codes in the code stream into the language preferred by the receiving user. The user's device also translates the sentence code in the code stream in Step 260. Next, using the translated sentence code, the user's device formats the translated word codes into a grammatically correct sentence in Step 270. Finally, in Step 280 the translated sentence is provided to the receiving user. In an embodiment of the present invention the translated sentence is provided in audio. In another embodiment of the present invention the translated sentence is provided in text.

As a result, User A and User B can communicate in their own language utilizing the multiple language translation system of the present invention.

Figure 2C:
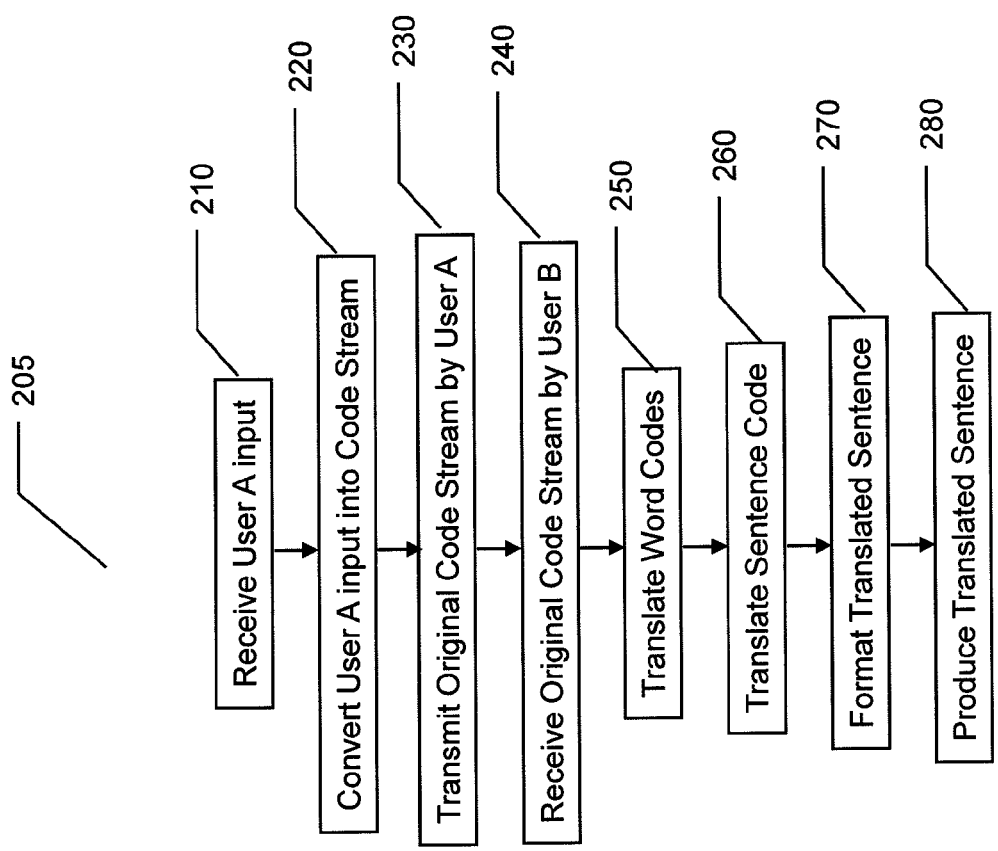

Refer to FIG. 2C, which is a flowchart illustrating a method of the multiple language translation system of the present invention according to an embodiment of the present invention.

The method 205 illustrated in FIG. 2C is similar to the method in FIG. 2B. However, in this embodiment prior to transmitting the original code stream in Step 230 the method begins in Step 210 by receiving the originating user's input (in this example User A). User A's device, in Step 220 converts or encodes the input into an original code stream. The method continues with the steps described regarding FIG. 2B.

In an embodiment of the present invention the user's input is an audio input. In another embodiment the user's input is text input on a keyboard.

Figure 3A:
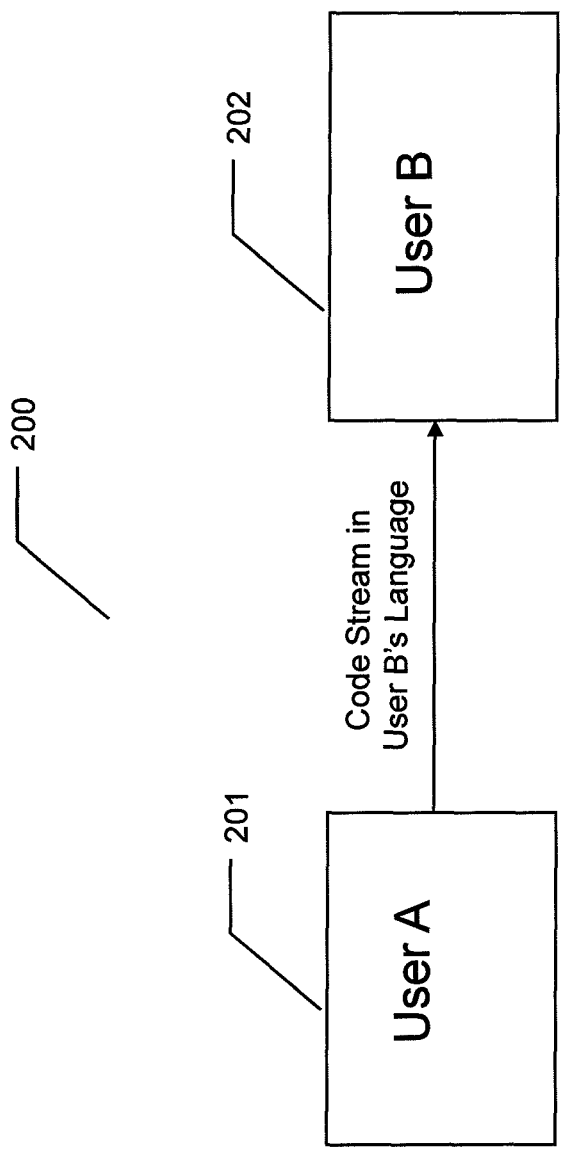
FIG. 3A is a drawing illustrating an architecture of the multiple language translation system of the present invention according to an embodiment of the present invention.

Refer to FIG. 3A, which is a drawing illustrating an architecture of the multiple language translation system of the present invention according to an embodiment of the present invention.

The architecture illustrated in FIG. 3A is similar to FIG. 2A but in this embodiment the code stream is transmitted in the receiving user's language. In FIG. 3A the receiving user is User B 202. However, the receiving user can be User A 201 if User B 202 is transmitting.

In this embodiment translating the input into the receiver's language and encoding of the code stream is performed on the transmitting user's device. This allows for the transmitting device to be powerful and the receiving device to be relatively simple. For example, in a situation such as the United Nations where numerous translations need to be performed for a large number of people, the facility can provide a very powerful computer system to translate and encode the code stream for multiple languages and send the appropriate code stream to the numerous receivers in the appropriate language. This allows for the receiving devices to be relatively simple devices since the device only needs to decode the code stream using the word codes and the sentence code and does not need to translate the word codes in the code stream.

Figure 3B:
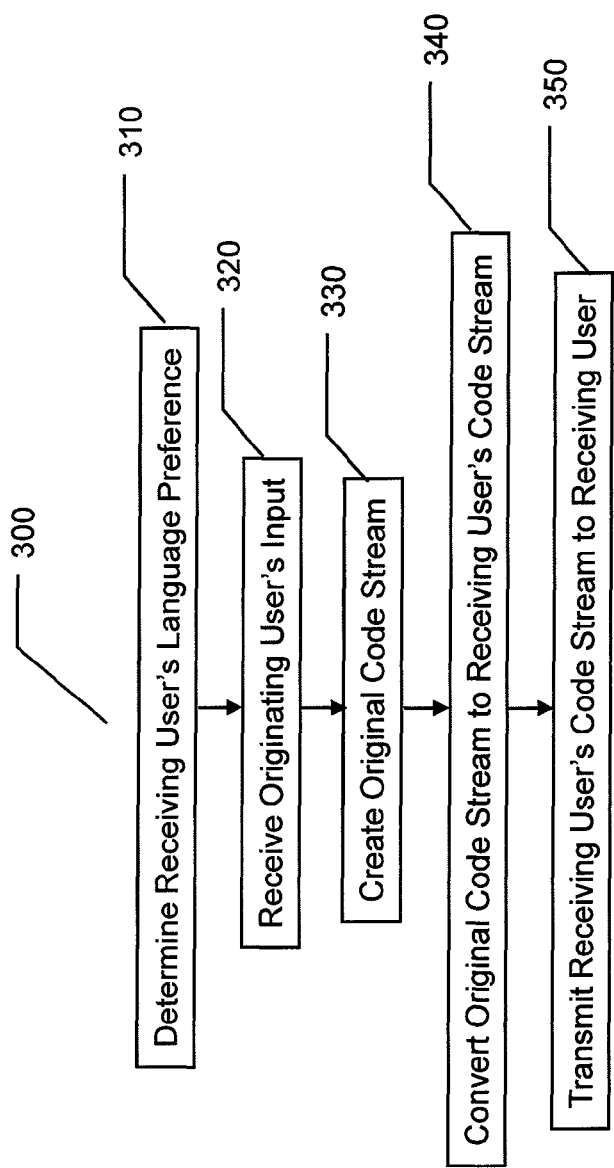
FIG. 3B is a flowchart illustrating a method of the multiple language translation system of the present invention according to an embodiment of the present invention.

Refer to FIG. 3B, which is a flowchart illustrating a method of the multiple language translation system of the present invention according to an embodiment of the present invention.

In the embodiment illustrated in FIG. 3B the method 300 begins by determining the receiving user's preferred language. This is performed by, for example, a preset user preference stored in the transmitting device, the receiving user sending their preference, or by reading the preference from the receiving device. Next, in Step 320 the transmitting device receives the originating user's input. Then the transmitting device creates an original code stream in the originating user's language in Step 330. In Step 340 the original code stream is converted into a receiving user's code stream in the receiving user's preferred language. Finally, the receiving user's code stream is transmitted to the receiving user in Step 350.

Figure 4A:
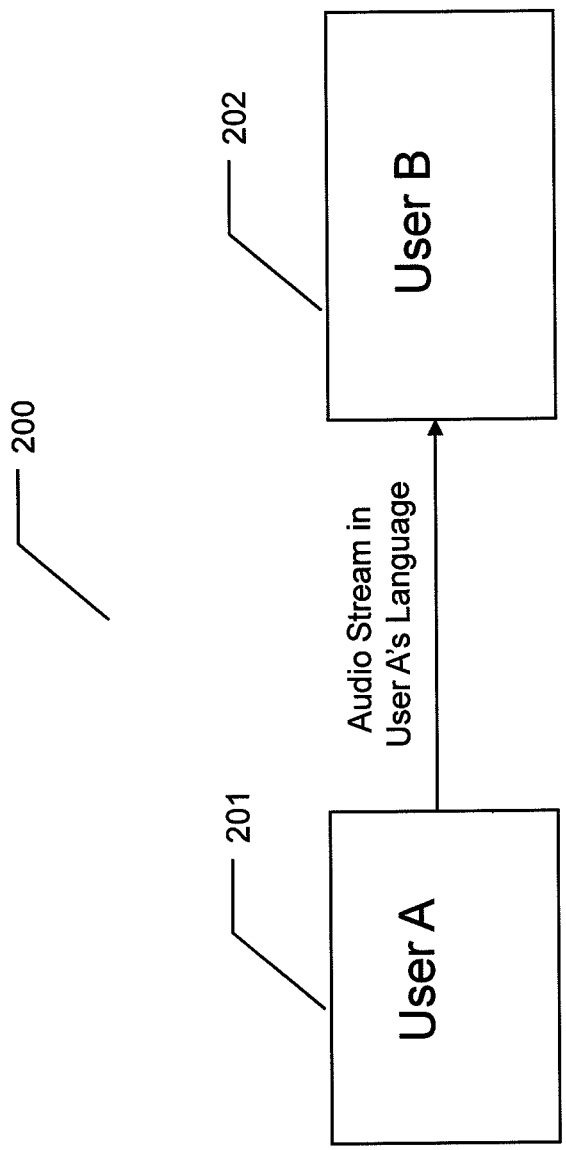
FIG. 4A is a drawing illustrating an architecture of the multiple language translation system of the present invention according to an embodiment of the present invention.

Refer to FIG. 4A, which is a drawing illustrating an architecture of the multiple language translation system of the present invention according to an embodiment of the present invention.

In the embodiment illustrated in FIG. 4A the architecture 200 is similar to FIG. 3A. However, in this embodiment instead of User A transmitting a code stream User A transmits an audio stream in User A's language to User B.

Figure 4B:
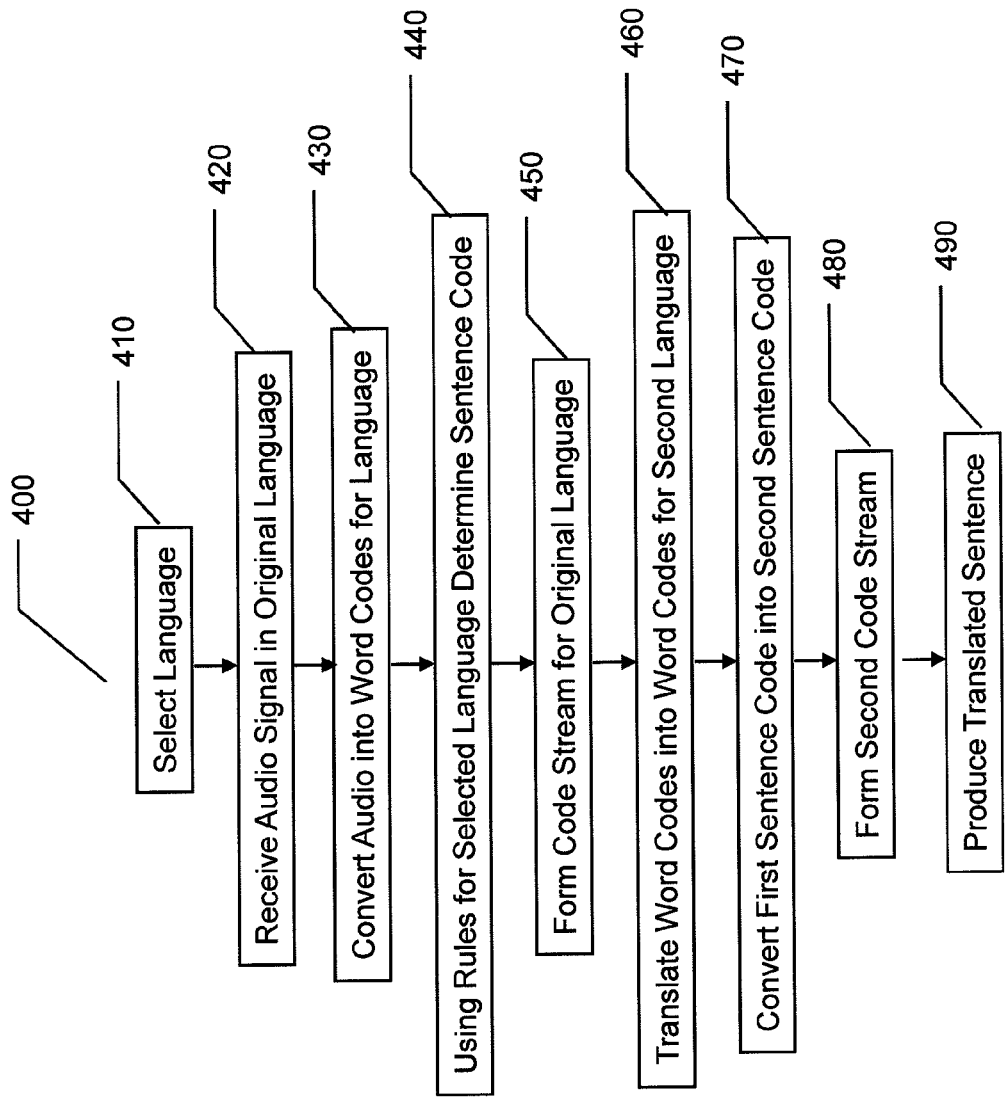
FIG. 4B is a flowchart illustrating a method of the multiple language translation system of the present invention according to an embodiment of the present invention.

Refer to FIG. 4B, which is a flowchart illustrating a method of the multiple language translation system of the present invention according to an embodiment of the present invention.

The method 400 begins in Step 410 with the receiving user selecting the language used by the transmitting user. In Step 420 the receiving user receives the audio stream from the transmitting user. The receiving user's device converts the audio stream into word codes for the selected language in Step 430. Then, is Step 440 a sentence code is determined using grammar rules for the selected language. A code stream is created comprising the language code, word codes, and sentence code for the selected language in Step 450. Next, in Step 460 the word codes in the code stream are translated into second word codes for the receiving user's language and in Step 470 the original sentence code is translated into a second sentence code. The second word codes, the second sentence code, and the language code for the receiving user's language are used to form a second code stream in 480. Finally, the translated sentence is produced in Step 490.

In an embodiment Step 490 is not utilized and the second code stream is preserved. In this embodiment the second code stream can be sent to another user, for example, such as a user using the same language in the code stream so that the code stream does not have to be translated again.

Figure 5A:
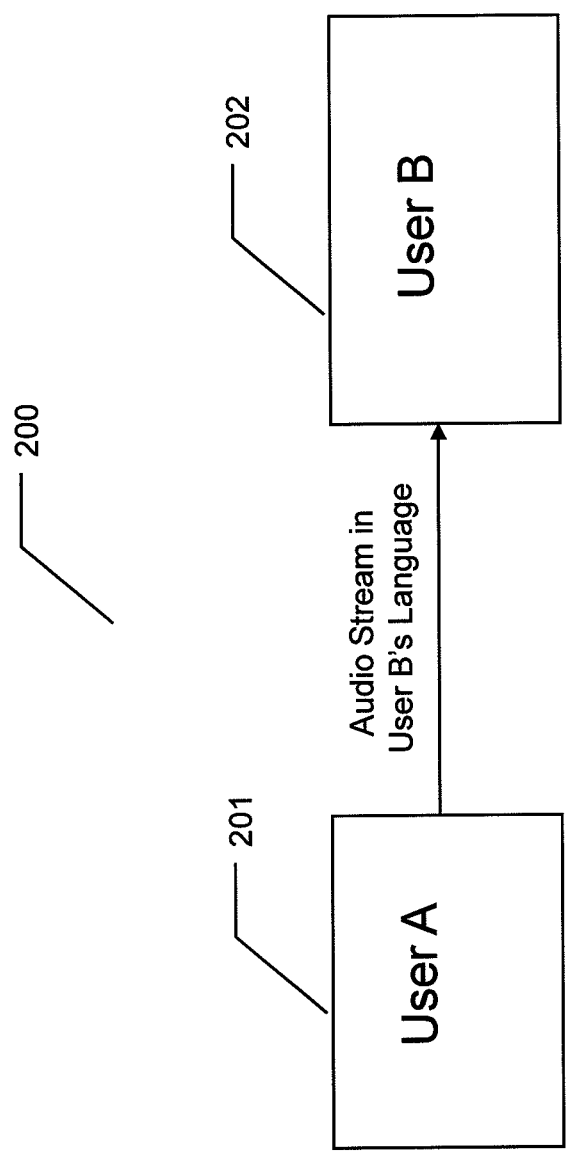
FIG. 5A is a drawing illustrating an architecture of the multiple language translation system of the present invention according to an embodiment of the present invention.

Refer to FIG. 5A, which is a drawing illustrating an architecture of the multiple language translation system of the present invention according to an embodiment of the present invention.

In the embodiment illustrated in FIG. 5A the architecture 200 is similar to FIG. 4A, however, in FIG. 5A an audio stream is transmitted in receiving user's language. In this embodiment User A's code stream is converted into an audio signal on User A's device.

Figure 5B:
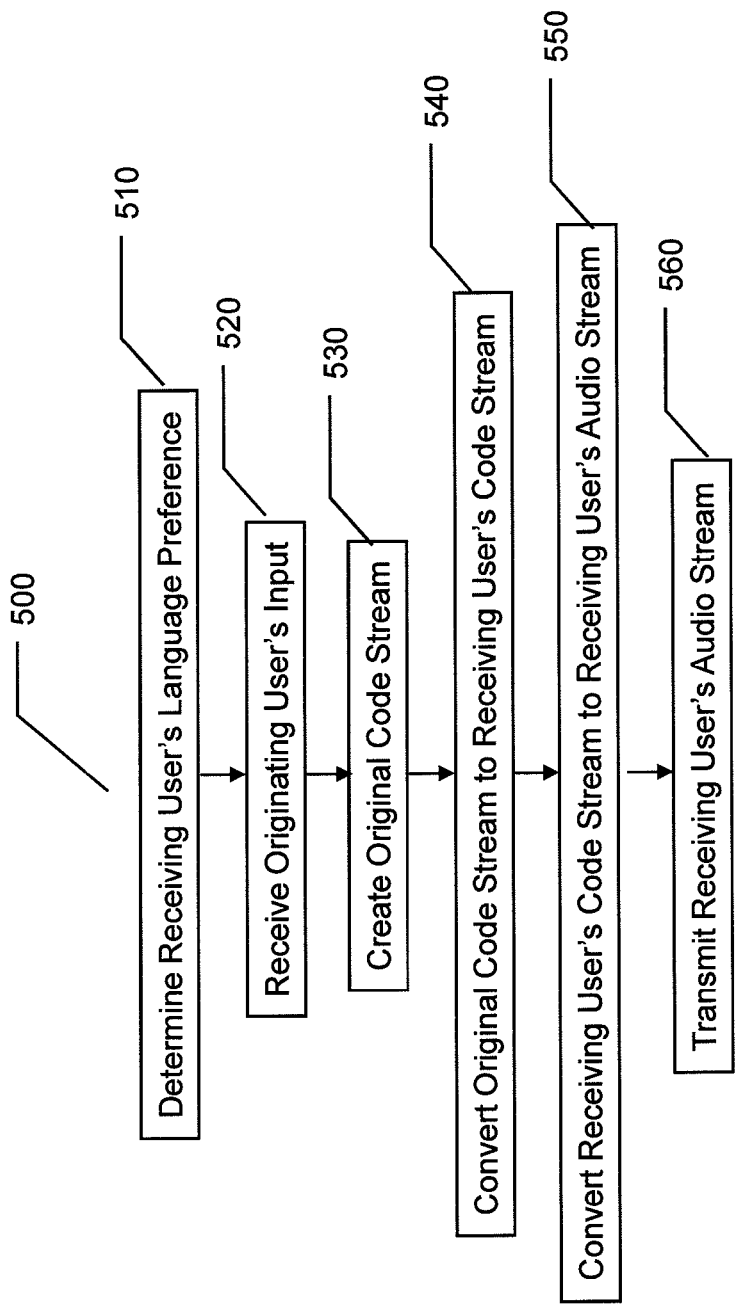
FIG. 5B is a flowchart illustrating a method of the multiple language translation system of the present invention according to an embodiment of the present invention.

Refer to FIG. 5B, which is a flowchart illustrating a method of the multiple language translation system of the present invention according to an embodiment of the present invention.

The method 500 illustrated in FIG. 5B begins in Step 510 by determining the receiving user's language preference. The originating user's input is then received in Step 520. In Step 530 the originating user's input is used to create an original code stream. Then, in Step 540 the original code stream is converted into a receiving user's code stream. Next, the receiving user's code stream is converted into a receiving user's audio stream in Step 550. Finally, in Step 560 the receiving user's audio stream is transmitted.

In an embodiment of the present invention the receiving user's audio stream is transmitted using a speaker system. For example, a presenter using a first language can speak to an entire audience that uses a second language. This eliminates the need for a translator who must interrupt the presenter.

Figure 6:
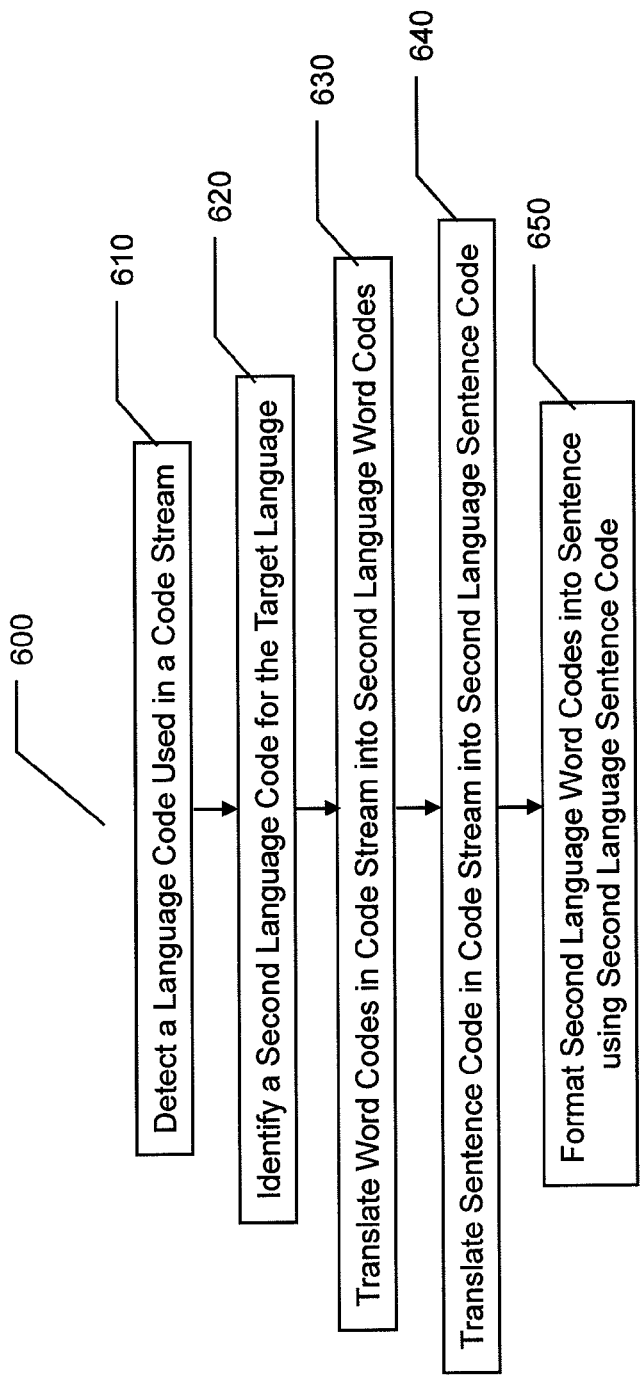
FIGS. 6-8 are flowcharts illustrating methods of the multiple language translation system of the present invention according to an embodiment of the present invention.

Refer to FIG. 6, which is a flowchart illustrating a method of the multiple language translation system of the present invention according to an embodiment of the present invention.

The method 600 illustrated in FIG. 6 begins in Step 610 by detecting a language code used in a code stream. In Step 620 a second language code for a target or second language is identified. The word codes in the code stream are translated into second language word codes in Step 630. In Step 640 the sentence code in the code stream is translated into a second language sentence code. Finally, the second language word codes are formatted into a sentence using the second language sentence code in Step 650.

Figure 7:
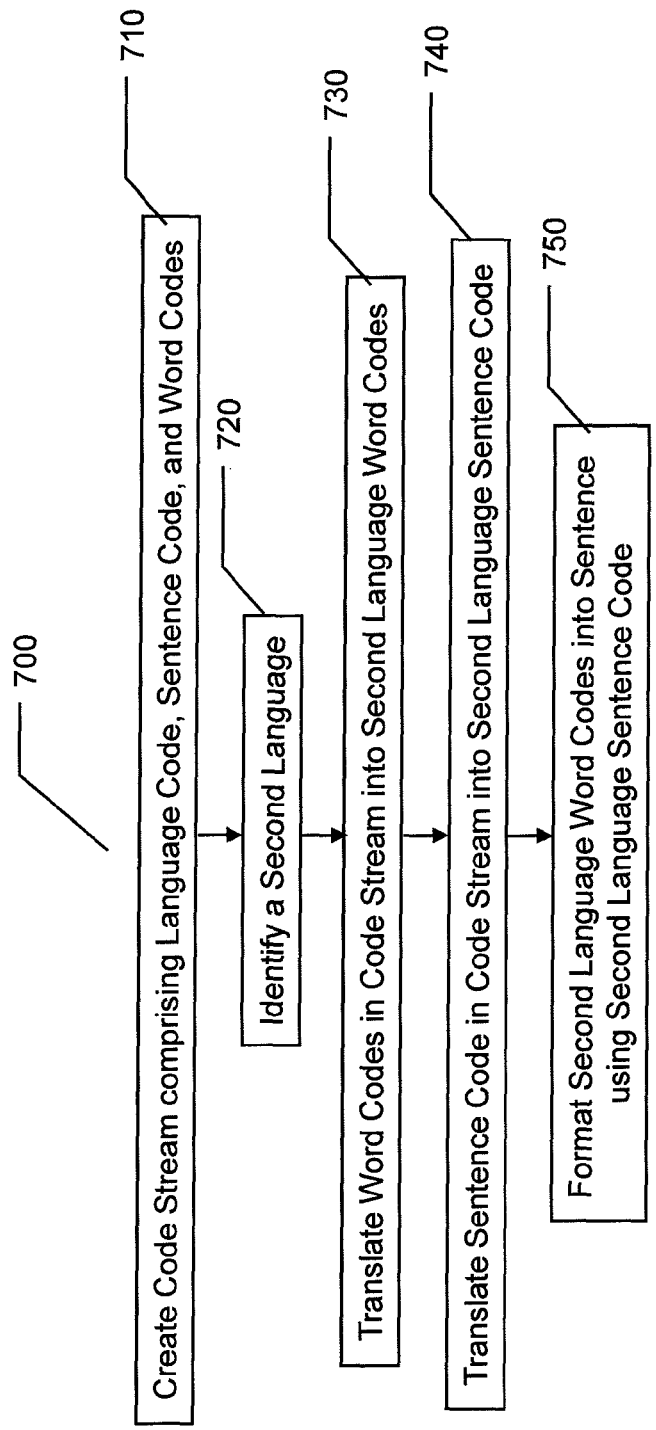

Refer to FIG. 7, which is a flowchart illustrating a method of the multiple language translation system of the present invention according to an embodiment of the present invention.

The method 700 begins in Step 710 by creating a code stream comprising a language code, a sentence code, and at least one word code. In situations where only one word code is used, the sentence code can be omitted. In Step 720 a second language is identified. The word codes in the code stream are then translated into word codes of the second language in Step 730. In Step 740 the sentence code in the code stream is translated into a sentence code for the second language. Finally, the second language word codes are formatted into a sentence using the second language sentence code in Step 750.

Figure 8:
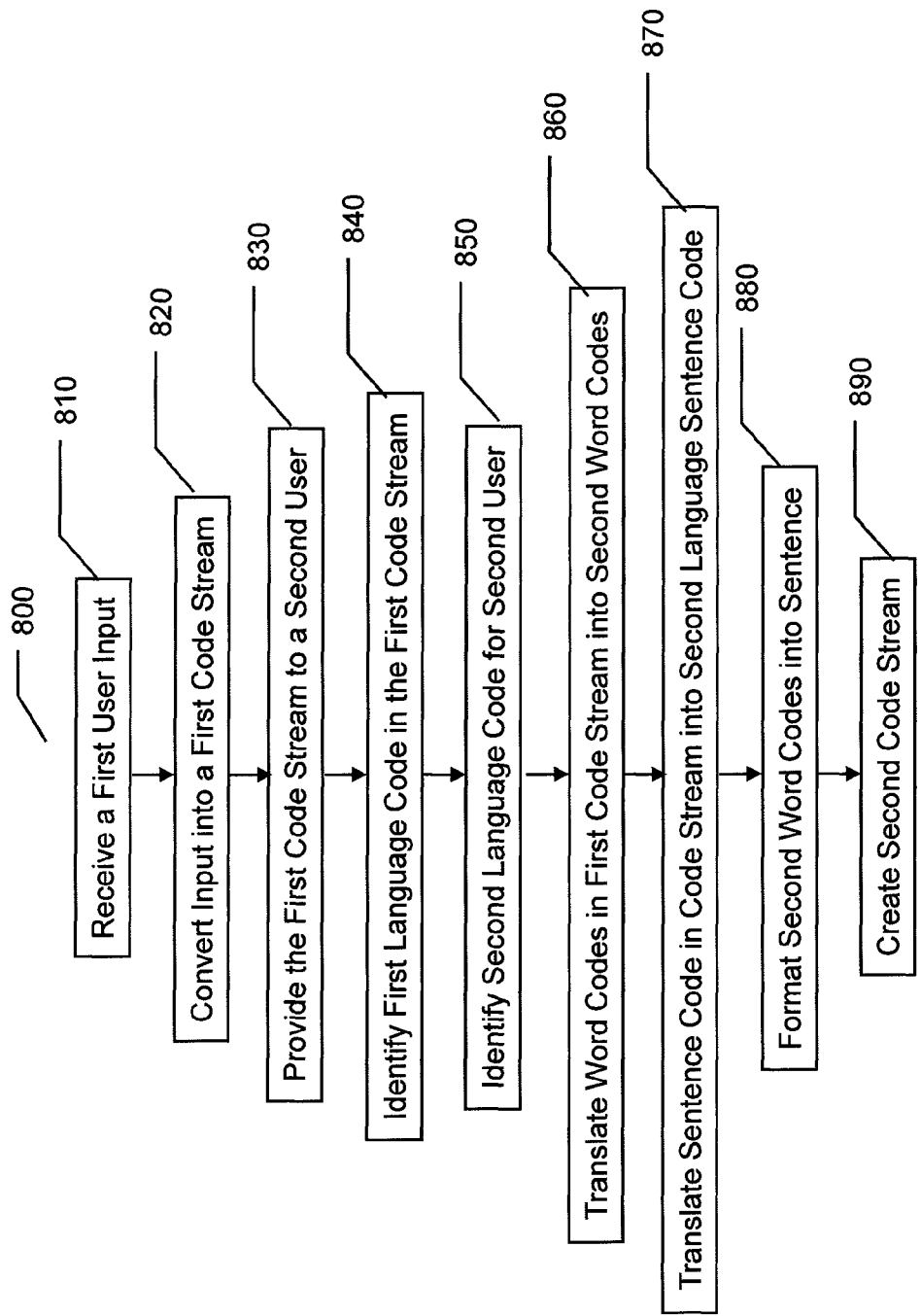

Refer to FIG. 8, which is a flowchart illustrating a method of the multiple language translation system of the present invention according to an embodiment of the present invention.

The method 800 begins in Step 810 by receiving a first user input. In Step 820 the first user input is converted into a first code stream. The first code stream is provided to a second user in Step 830. In Step 840 the first language code in the first code stream is identified and in Step 850 the second language code for the second user is identified. The word codes in the first code stream are translated into second language word codes in Step 860. In Step 870 the sentence code in the code stream is translated into a second language sentence code. The words represented by the second word codes are then formatted into a sentence using the second language sentence code in Step 880.

Figure 9A:
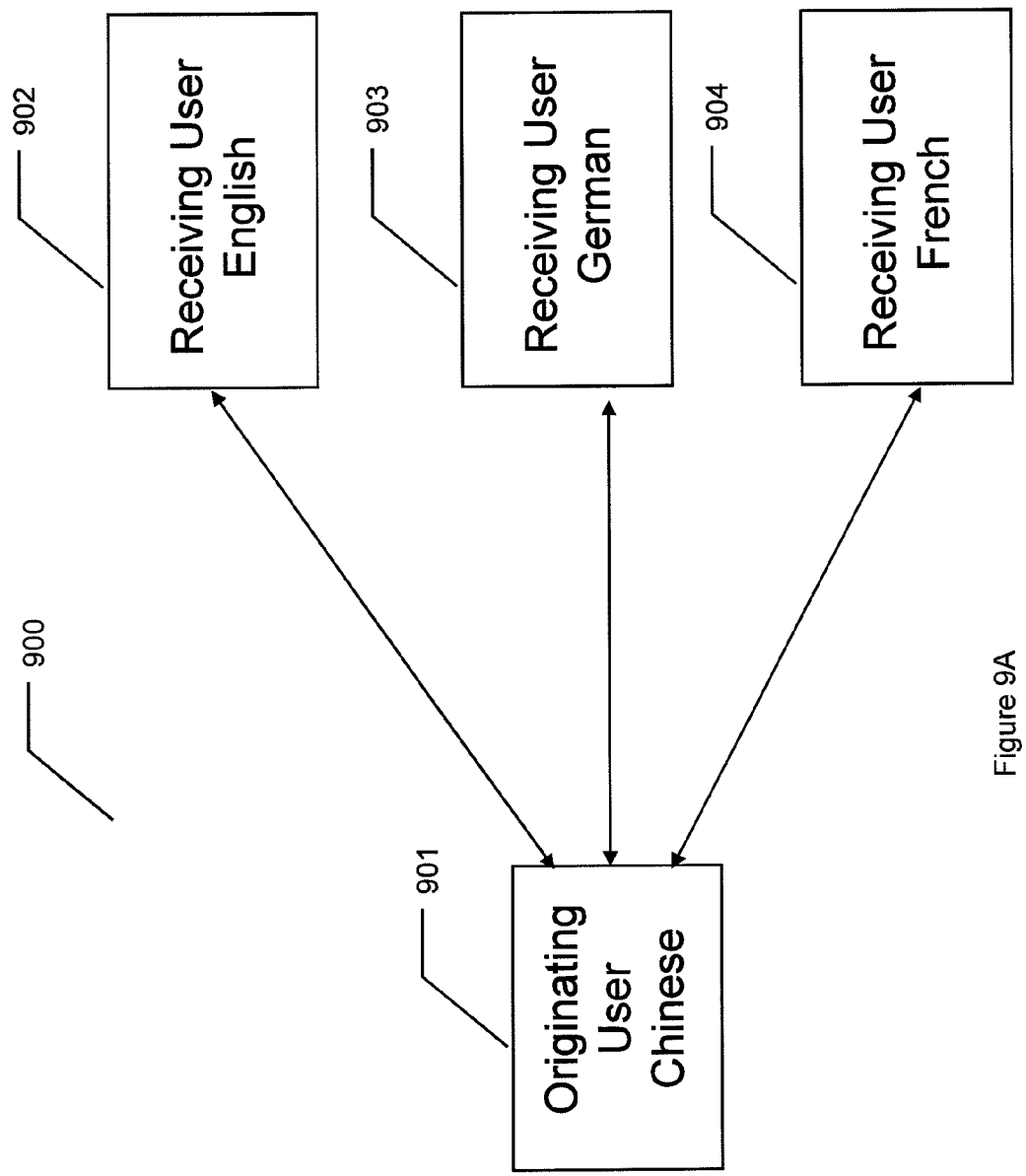
FIGS. 9A-9B are drawings illustrating an application structure for an auto-select function for a multiple language translation system according to an embodiment of the present invention.

Refer to FIG. 9A, which is a drawing illustrating an application structure for a translation link and popularity ranking function for the multiple language translation system of the present invention according to an embodiment of the present invention.

In the embodiment illustrated in FIG. 9A the multiple language translation system of the present invention further comprises a translation link and popularity ranking function 900. When the originator of the code stream sends the code stream to other users, the users receiving the code stream are presented with a list of various translations. The other users individually select which translation they believe is correct. Each individual user's selection will then be sent back to the originator of the code stream.

The originator's device, upon receiving the selections from the individual users, places these translation selections into the database and links the selections to the originator's code stream. As more receiving users provide selections back to the originator a popularity of correctness is attached to each translation of the original code stream. As a result, based on the popularity of the selected correct translation the most popular translation is provided first and less popular translations are provided subsequently.

Referring to FIG. 9A, the originator of the code stream 901 is, for example, using Chinese. Also, for example, receiving user 902 is using English, receiving user 903 is using German, and receiving user 904 is using French.

Originating user 901 sends a code stream to receiving users 902,903,904. Receiving user 902 is presented with options of possible translations in English, receiving user 903 is presented with options of possible translations in German, and receiving user 904 is presented with options of possible translations in French.

Each receiving user 902,903,904 reviews the translated options and selects which translation they individually believe or know to be correct. The selected translations are then sent back to the originating user 901 in, for example, a code or code stream. The device of the originating user 901 links the selected translations to the originating user's sentence in the original code stream in the system database. A popularity rating is attached to each translated sentence. As a translation is selected by users more frequently or less frequently the popularity rating is adjusted. When a code stream is sent the options for the translation are sorted according to the current popularity rating. As a result, the receiving users are presented with the most likely correct translations before less likely correct translations.

For example, the originating user uses the Chinese sentence "Wo Ai Ni" (我爱你) to and receiving users using English have responded with the selected translation "I Love You" 85% of the time, "Love You" 10% of the time, and "My Love" 5% of the time. Each of these English translations is linked to the original Chinese sentence in the database. When an originating user uses "Wo Ai Ni" (我爱你) the English translation is either selected as "I Love You" or all translations are provided in descending order according to their popularity rating.

In an embodiment of the present invention the selected translations are linked and ranked according to the popularity in the originator's database.

In another embodiment of the present invention the selected translations are linked and ranked according to the popularity in both the originator's database and the receiving user's database.

Figure 9B:
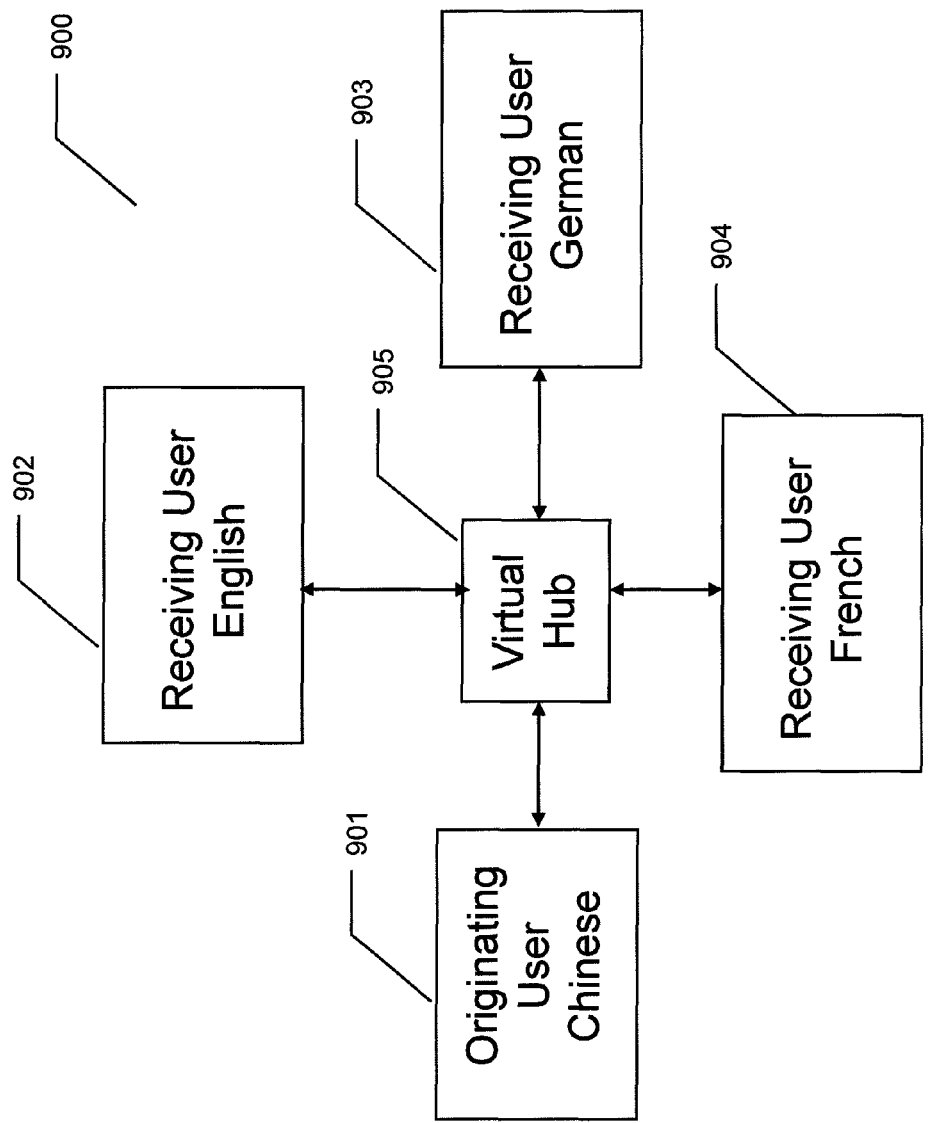

Refer to FIG. 9B, which is a drawing illustrating an application structure for a translation link and popularity ranking function for the multiple language translation system of the present invention according to an embodiment of the present invention.

In the embodiment illustrated in FIG. 9B the translation link and popularity ranking function 900 further comprises a virtual hub 905. This embodiment is similar to the embodiment illustrated in FIG. 9A; however, in the embodiment illustrated in FIG. 9B each user 901,902,903,904 receives the selected translation from each of the other users. In this way, each user's database is continually updated with translation links and popularity rankings. As a result, each user's translations in multiple translation system will be rapidly and continuous improved.

For example, the originating user 901 uses the Chinese sentence "Wo Ai Ni" (我爱你) and receiving user 902 selects the English sentence "I Love You" as the correct translation and receiving user 904 selects the French sentence "Je t'aime". The selected translations for the English and French are provided via the virtual hub 905 to all users 901, 902,903,904 even if the receiving user did not provide a selection (in this example user 903).

The original sentence in Chinese and the two selected translations in French and English are then linked or the link is updated in each user's database. Therefore, even users who may need a translation to that language at the current time, in the future a link to the translation and a popularity ranking is available.

In some embodiments of the present invention the translation can be selected to be provided on a display device or a speaker/headset. For example, with users whose hearing is limited, even if the original sentence was spoken the translation would appear on the display. Or, for users whose eyesight is limited, even if the original sentence was typed the translation would be output from the speaker/headset.

In some embodiments of the present invention the code stream comprises additional codes. For example, a speed code indicating the speed of the user's input, a volume code indicating the volume of the user's input, a punctuation code indicating the punctuation used in the sentence, etc.

Figure 10A:
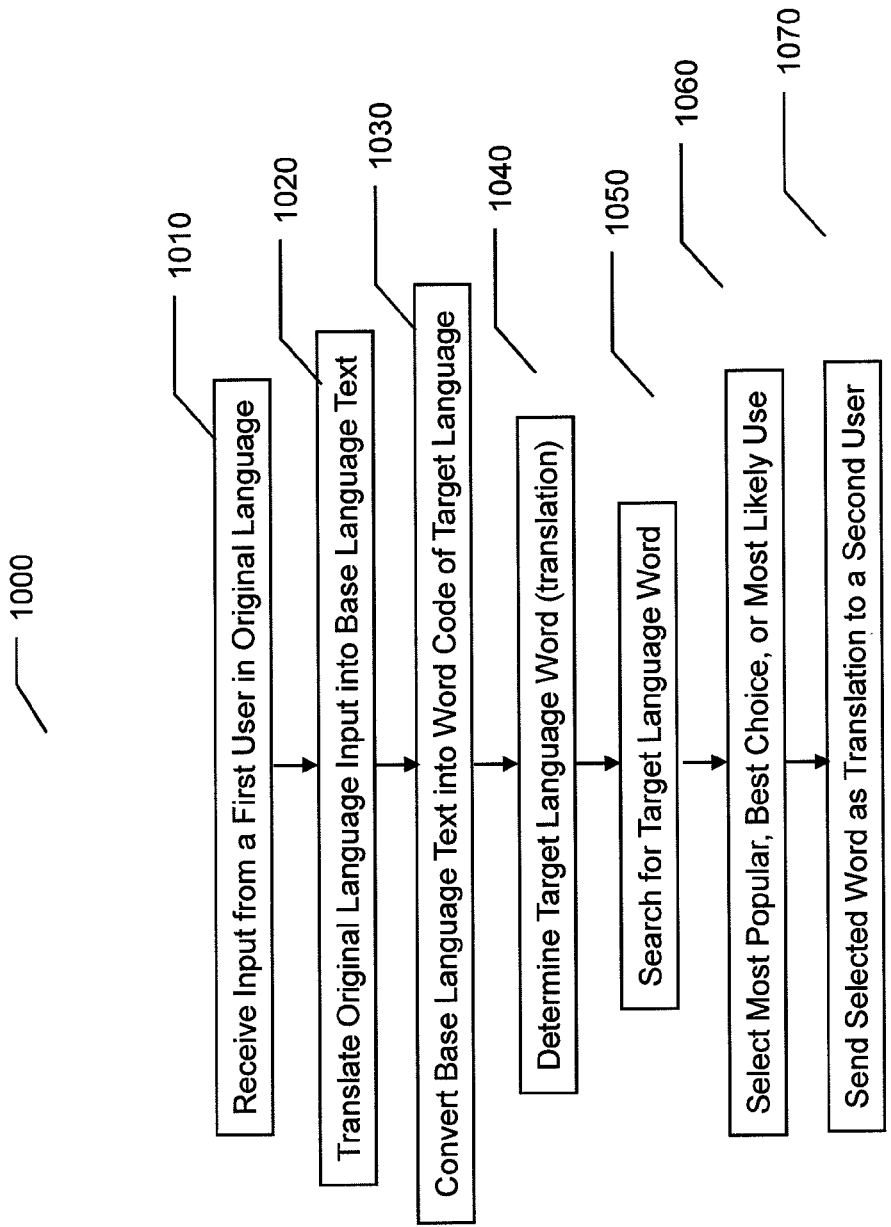
FIGS. 10A-10D are drawings illustrating flowcharts of a multiple language translation system of an embodiment of the present invention.

Refer to FIG. 10A, which is a drawing illustrating a flowchart of a multiple language translation system of an embodiment of the present invention.

The multiple language translation system 1000 begins by receiving an input from a first user in an original language in Step 1010. In Step 1020 the original language input by the first user is translated into text in a base language. Next, the base language text is converted into a word code of a target language in Step 1030. In Step 1040 the word in the target language is determined. The target language word is then searched for in Step 1050. After searching is completed a target language word is selected from the search results in Step 1060. For example, the most popular instance of the word, or the most likely instance of the word, or the best choice instance of the word is selected. Finally, in Step 1070 the selected word is sent to a user, for example a second user, as a translation. This translation is provided in the preferred language of the second user.

In this way, the first user provides an input in the first user's preferred language and the second user receives the translation of the input in the second user's preferred language.

Refer to FIG. 12A, which is a drawing illustrating a letter code system where letters in a base language are represented by numbers according to an embodiment of the present invention.

In the embodiments illustrated in FIGS. 10A-10D a letter code system shown in FIG. 12A is utilized.

In these embodiments a base language is selected. In this example English is selected as the base language for the system, however, in other embodiments other languages are selected as the base language.

As shown in FIG. 12A each letter of the English alphabet (A-Z) has an associated number; A=1, B=2, C=3 . . . N=14, O=15, P=16 . . . X=24, Y=25, Z=26.

Therefore, words in the English language can be written as numbers. For example:

PIG=16(P)9(I)7(G)=1697

Refer to FIG. 12B, which is a drawing illustrating format of a word code according to an embodiment of the present invention.

In the embodiment illustrated in FIG. 12B a word code 1200 comprises a language code 1210, a number code 1220, and a grammar code 1230. The language code 1210 indicates the language used, the number code 1220 represents a word in the base language, and the grammar code 1230 indicates grammatical usage or type of the word. The language code 1210, the number code 1220, and the grammar code 1230 each are formed using the letter coding illustrated in FIG. 12A.

Refer to FIG. 12C, which is a drawing illustrating a comparison of word codes for different languages according to an embodiment of the present invention.

In the example illustrated in FIG. 12C the word 1240 in the language 1205 is "Dog" in English. The language code 1210 for English is 514 (E=5 and N=14). The number code 1220 for "Dog" is 4157 (D=4, O=15, and G=7). Since "Dog" is a noun the grammar code 1230 is 14152114 (N=14, O=15, U=21, and N=14).

Therefore, the word code for the English word "Dog" is 514 4157 14152114.

In some embodiments of the present invention a separator or spacer is inserted between the language, number, and grammar code. For example 514#4157#14152114 is used where the # acts as a separator or #514#4157#14152114 is used where the # acts as a separator In another embodiment of the present invention the separators for each code are distinct. For example, # for language code, $ for number code, and % for grammar code. Distinct or different separators allow the language code, number code, and grammar code to be easily positioned in different orders or arrangements. For example, grammar code, number code, language code or number code, language code, grammar code, or number code, grammar code, language code, etc.

In another embodiment of the present invention each code has a defined length or size. For example, ten places with leading zeros or other characters such as 0000000514 or ######0514. Using the above example the code would be #######514######4157##14152114.

Continuing on with FIG. 12C, the language code 1210 for Chinese is 314 (CN), for French is 618 (FR), and for Spanish is 1916 (SP).

Since English was selected as the base language the number code 1220 and the grammar code 1230 remain the same for each language.

For example:
The word code for "Dog" in English is 514#4157#14152114;
The word code for Chinese is 314#4157#14152114 and represents "狗";
The word code for French is 618#4157#14152114 and represents "Chien"; and
The word code for Spanish is 1916#4157#14152114 and represents "Perro".
Although the number code and the grammar code are the same letter coding for the base language, the language code determines the correct word in the target language.
Referring back to FIG. 1A, the following example is given:
For this example, the base language is selected as English, original language used by a first user is Spanish, and the preferred language of a second user is French.
A first user inputs the Spanish word "Perro". This is achieved by typing the word, speaking the word, scanning a document with the word, inputting by using a camera, viewing the word through a camera viewfinder, etc.
Next the Spanish word "Perro" is translated into the base language. In this example English was selected as the base language. Therefore "Perro" is translated into the English word "Dog".
The word "Dog" is then converted into a word code of the target language. Language code=618 (target language FR), number code=4157 (Base code "Dog", and the grammar code=14152114 (base code "Noun"). Therefore the word code of the target language is 618#4157#14152114.
Next the target language word represented by the word code 618#4157#14152114 is determined to be "Chien".
The target language word "Chien" is search for, for example, on a server, on a search engine server, by a search engine server, on a network, or on the internet.
After searching is complete the search results are analyzed to find the most popular, best choice, or most likely use or word.
Once the selection is made, the selected word is sent to the second user as a translation. In this case the French word "Chien" is received by the second user even though the first user input the Spanish word "Perro".

In an embodiment of the present invention the system further comprises a step of converting the base language text into a word code of the base language before forming a word code of the target language. This allows for translating the same word in the base language into numerous translations by changing the language code.

Figure 10B:
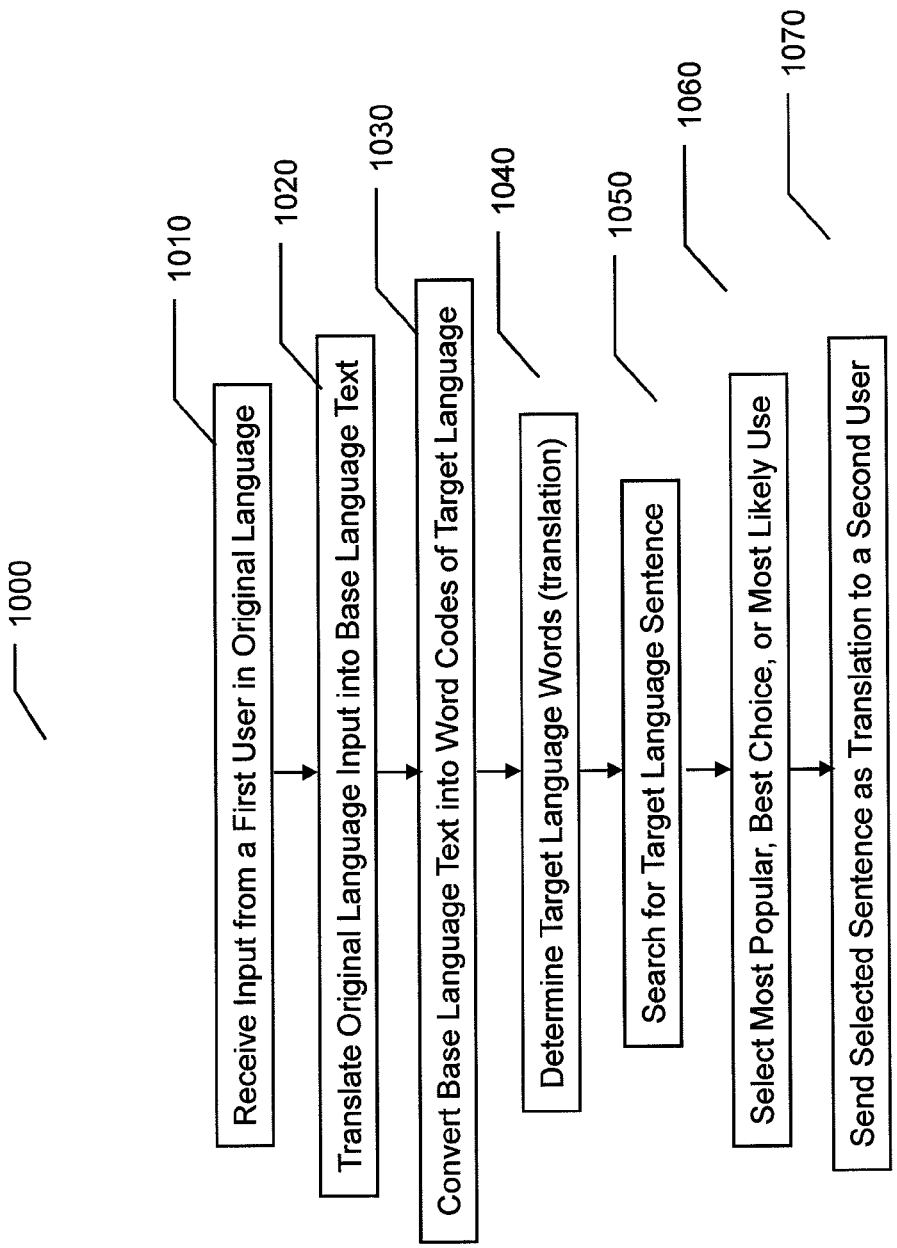

Refer to FIG. 10B, which is a drawing illustrating a flowchart of a multiple language translation system of an embodiment of the present invention.

The embodiment illustrated in FIG. 10B is similar to the embodiment illustrated in FIG. 10A. However, the embodiment of FIG. 10B provides translation of sentences rather than single words.

The system 1000 begins by receiving a plurality of words such as a sentence input by a first user in an original language in Step 1010. In Step 1020 the sentence is translated from the original language into text in the base language. Next, each of the words in the base language text is converted into a word code of the target language in Step 1030 and the target language words are determined in Step 1040. The target language words are then searched for in Step 1050. For example, searching a server, network, search engine server, or the internet for phrases or sentences using the target language words. The results of the search are then analyzed and a selection is made in Step 1060. The selection is made by certain criteria such as, for example, the most popular use of the target language words, the most likely usage of the phrase or sentence made from the target language words, or other criteria such as making a best choice for the appropriate use. After selecting the appropriate phrase or sentence from the search results, the selected sentence is sent to the second user as a translation in Step 1070.

For example, if the target language sentence is "It is rather hot today" the search results might return the following:
It's hot!
It's scorching outside
It's burning up
It's hot today, etc.
If the selection criteria is based on popularity then "It's hot!" might be chosen over "It is rather hot today" if it is more commonly used. This allows the system to provide a translation of a sentence that is more appropriate because the phrase is more commonly used. This is an advantage of the present invention as the system is continually updated with current language usage as language evolves.

Figure 10C:
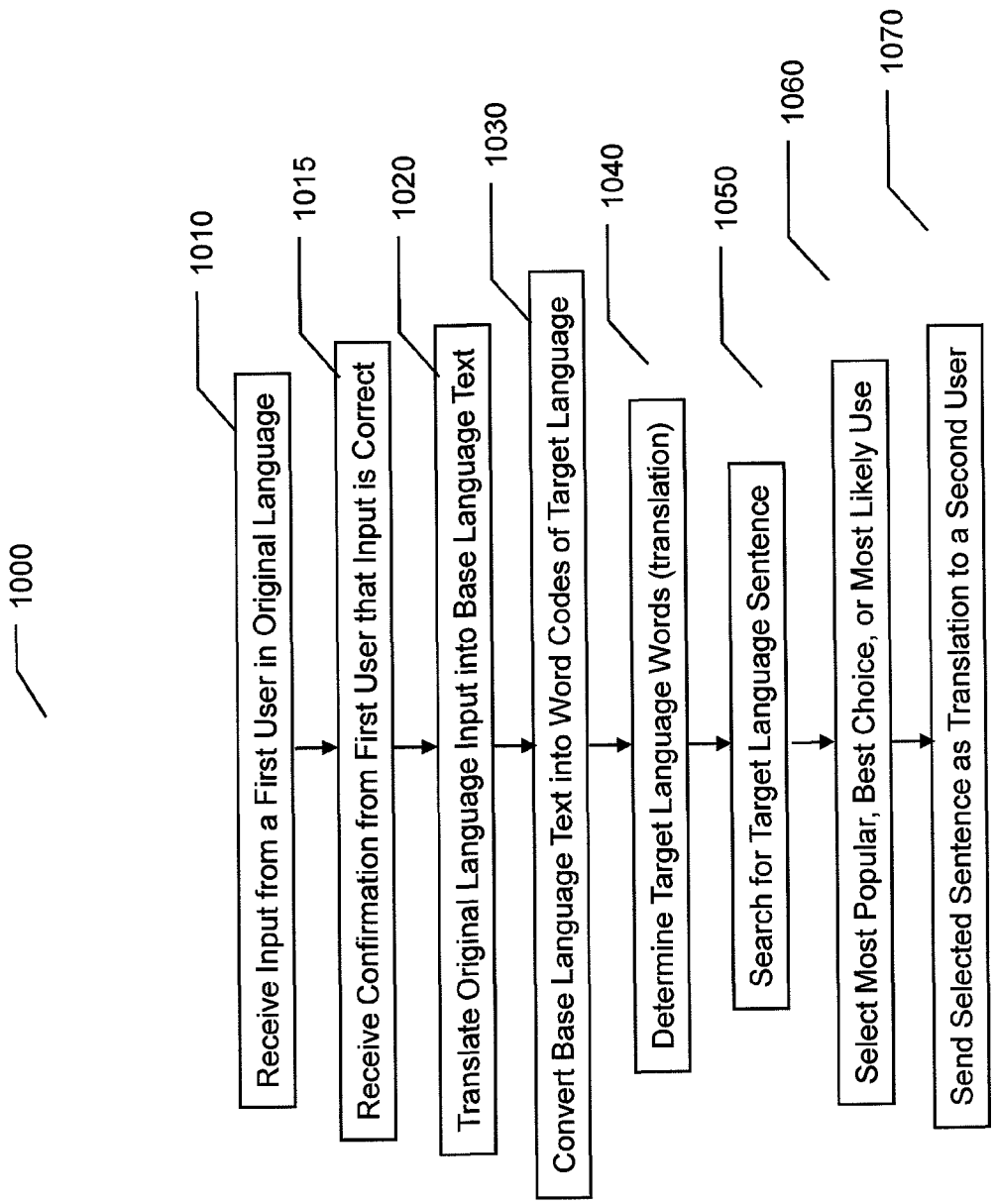

Refer to FIG. 10C, which is a drawing illustrating a flowchart of a multiple language translation system of an embodiment of the present invention.

The embodiment illustrated in FIG. 10C further comprises a step of receiving confirmation from the first user that the input is correct in Step 1015.

In the embodiment the system is prevented from performing wasteful tasks if the original input was incorrect. After inputting the first user observes the input and confirms that the input was received or input correctly.

Figure 10D:
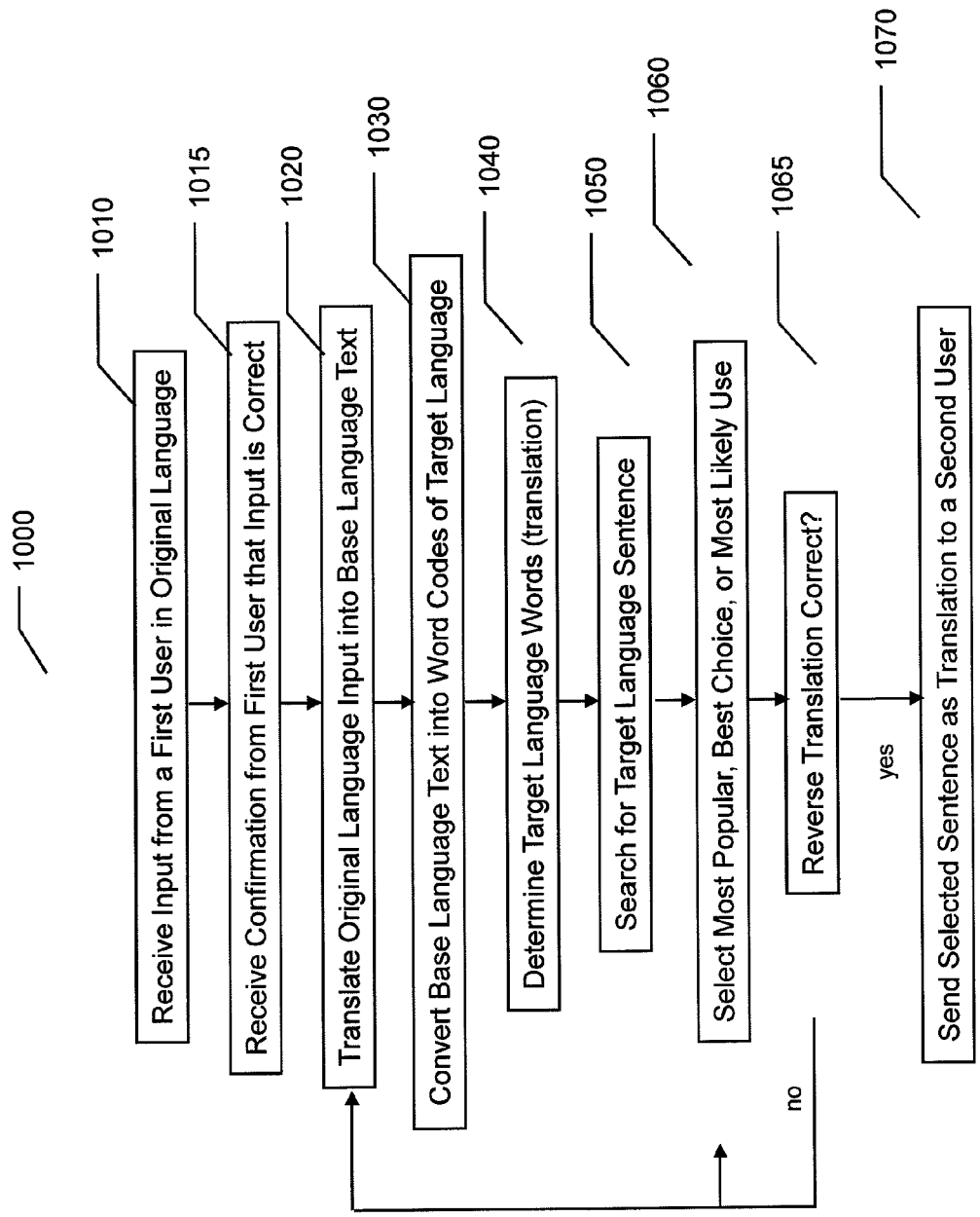

Refer to FIG. 10D, which is a drawing illustrating a flowchart of a multiple language translation system of an embodiment of the present invention.

In the embodiment illustrated in FIG. 10D the multiple language translation system 1000 further comprises a reverse translation process to confirm that the translation is correct in Step 1070. If the translation is correct the translation is sent to the second user in Step 1070. If incorrect, the system will return to Step 1020 or Step 1060. For example, if the system returns to Step 1060 another sentence is selected from the search results.

Figure 11A:
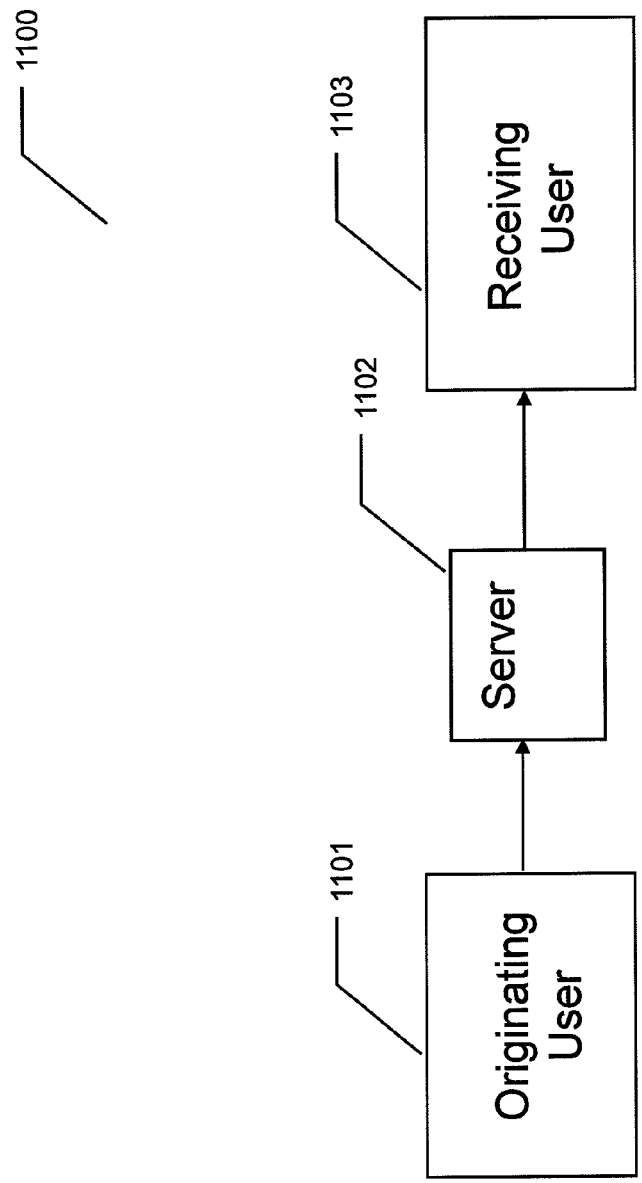
FIGS. 11A-11C are drawings illustrating an architecture of a multiple language translation system of an embodiment of the present invention.

Refer to FIG. 11A, which is a drawing illustrating an architecture of a multiple language translation system of an embodiment of the present invention.

In the embodiment illustrated in FIG. 11A the architecture 1100 of the system comprises an originating user device 1101, a server 1102, and a receiving user device 1103.

The originating user inputs a word, phrase, or sentence using the originating user device 1101. This input is then sent to the server 1102. The server 1102 then performs the translation of the original language input into the base language text, converts the base language text into a target language word code or word codes, determines the target language word or words, searches for the word or words, selects the best word, words, phrase, or sentence from the search results, and sends the selection to the receiving user device 1103. As a result, the originating user's input in the original language is translated and provided to the receiving user's device in the receiving user's preferred target language.

Figure 11B:
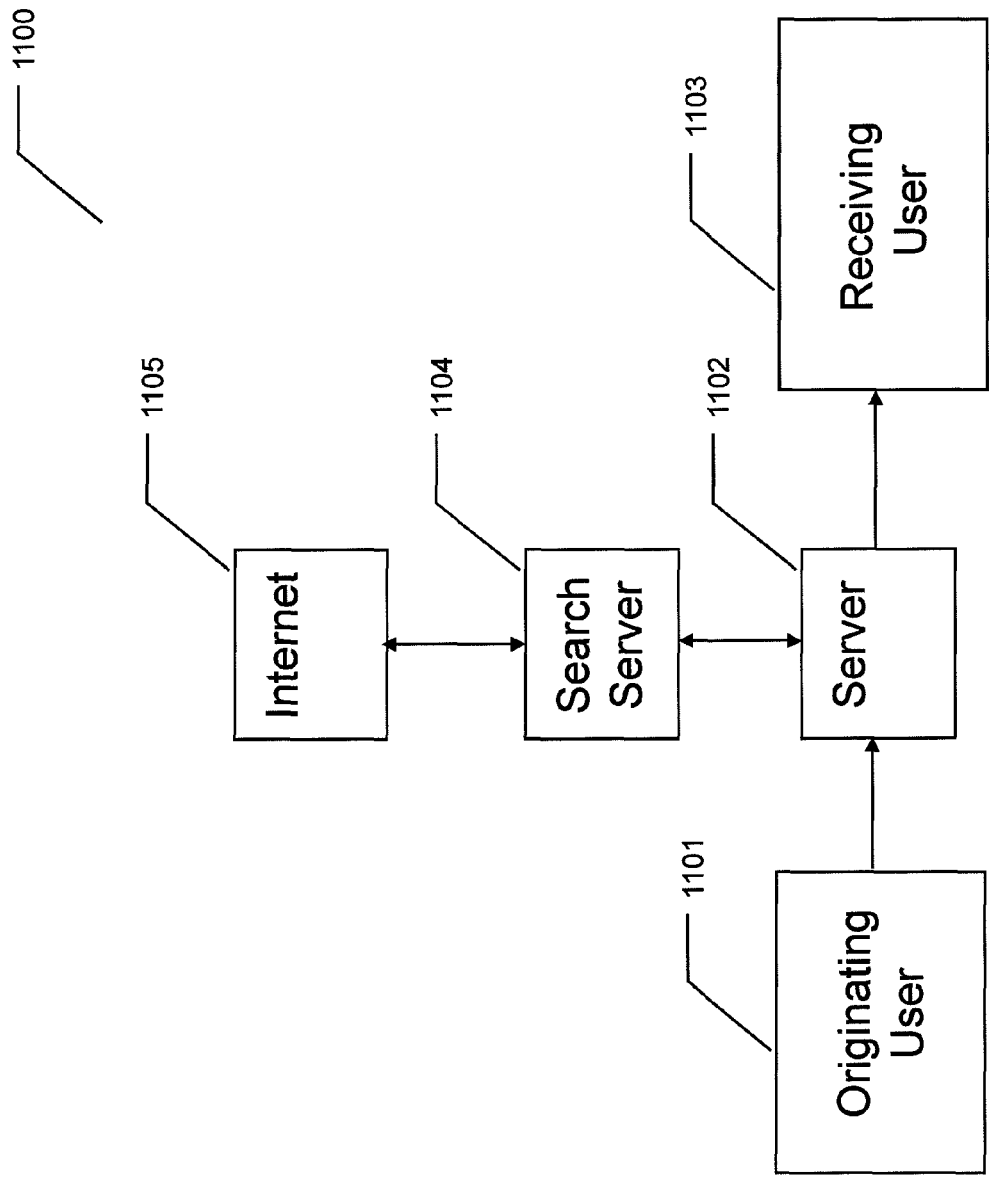

Refer to FIG. 11B, which is a drawing illustrating an architecture of a multiple language translation system of an embodiment of the present invention.

The embodiment illustrated in FIG. 11B is similar to the embodiment of FIG. 11B. However, the embodiment of FIG. 11 further comprises a search server 1104. The server 1102 performs the translation of the original language input into the base language text, converts the base language text into a target language word code or word codes, determines the target language word or words, and sends a search request for the target language word or words to the search server 1104. The search server 1104 then searches the internet 1105 for uses of the target language words and provides the search results to the server 1102. The server 1102 then selects the best word, words, phrase, or sentence from the search results, and sends the selection to the receiving user device 1103.

Figure 11C:
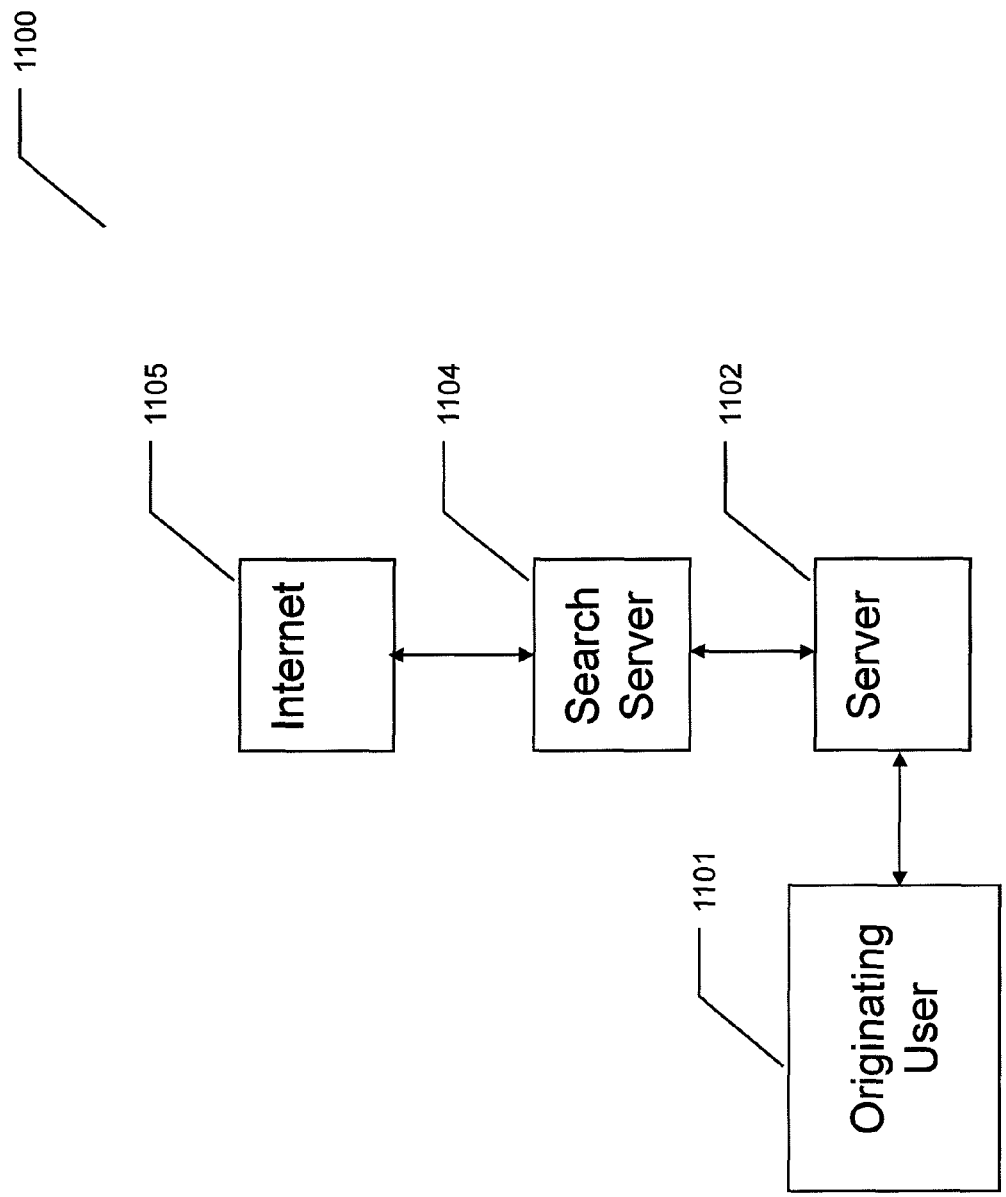

Refer to FIG. 11C, which is a drawing illustrating an architecture of a multiple language translation system of an embodiment of the present invention.

In the embodiment illustrated in FIG. 11C the server 1102 sends the selection to the originating user device 1101 rather than sending the selection to a second user device. This allows the originating user to see or hear the translation so that the originating user can make use of the translation directly. This is useful for studying a second language or for onsite translation that can be used by someone that is in close proximity to the originating user but doesn't have a user device.

In an embodiment of the present invention the multiple language translation system is utilized in a telephone conversation or a conference call with multiple users. For example, a first user makes a call to a second user. After being connected the first user speaks into their handset or types into their handset a sentence or phrase in the first user's language. The second user will hear or see a translation of the sentence or phrase in the second user's language. In an embodiment of the present invention the translation, conversion, searching, and selection of translation from search results are performed by the first user's handset. In another embodiment the translation conversion, searching, and selecting processes are performed by a server separate from the first user's handset. As a result, users can communicate with other users using their own language and telephone handsets.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A multiple language translation method being implemented in a computer system having a processor and a non-transitory memory, the method comprising:
   creating a code stream by an originating user;
   detecting a language code indicating a language used in the code stream;
   identifying a second language code indicating a second language;
   translating word codes in the code stream into second language words by using the language code and the second language code;
   translating a sentence code in the code stream into a second sentence code;
   formatting the second language words into a sentence structure by using the second sentence code;
   searching via internet for the second language words formatted into the sentence structure;
   ranking search result entries based on popularity of usage;
   selecting a plurality of search result entries from search results based on ranking of the search result entries;
   performing a reverse translation process on the selected search result entries to translate each of the selected search result entries back into the language used in the code stream;
   presenting results of the reverse translation process to the originating user in the language of the code stream;
   receiving indications from the originating user for the results of the reverse translation process that are correct;
   sending translations of the results of the reverse translation process that the originating user indicated were correct from an originating user device to a receiving user device in the second language;
   presenting a list of various translations of the code stream that the originating user indicated were correct to the receiving user on the receiving user device;
   selecting a preferred translation from the list by the receiving user at the receiving user device;
   sending the preferred translation to the originating user device;
   updating a database of the originating user device linking the preferred translation to the code stream and;
   updating the database of the originating user device with results of the reverse translation process, search result entry rankings, and indications made by the originating user about the results of the reverse translation process.

2. The multiple language translation method of claim 1, the word codes in the code stream each comprising a number code and a grammar code.

3. The multiple language translation method of claim 1, the sentence code indicating a sentence structure according to a language indicated by the language code.

4. The multiple language translation method of claim 2, the number code indicating a word and the grammar code indicating grammatical usage of the word.

5. The multiple language translation method of claim 1, the code stream further comprising a first user code uniquely identifying a user that created the code stream.

6. The multiple language translation method of claim 1, the code stream further comprising a device code uniquely identifying a device used to create the code stream.

7. A multiple language translation method being implemented in a computer system having a processor and a non-transitory memory, the method comprising:

receiving an original language input from an originating user;

translating the original language input into base language text;

converting the base language text into at least one word code;

determining at least one target language word using the at least one word code;

searching for the at least one target language word;

ranking search result entries based on user preferred translations submitted by other users;

selecting a search result entry from search results based on user preferred translations ranking;

performing a reverse translation process on the selected search result entry to translate the selected search result entry back into a language of the original language input;

presenting result of the reverse translation process to the originating user in the language of the original language input;

receiving an indication from the originating user that the result of the reverse translation process is correct;

selecting another search result entry from the search results if the originating user indicates that the result of the reverse translation process is not correct;

performing the reverse translation process and presenting the result of the reverse translation process to the originating user until the originating user indicates that the result of the reverse translation process is correct;

sending the translation from an originating user device to a receiving user device when the originating user indicates that the result of the reverse translation process is correct;

presenting the translation of the code stream that the originating user indicated was correct to the receiving user on the receiving user device;

selecting the translation if preferred by the receiving user at the receiving user device;

sending the translation if preferred by the receiving user to the originating user device;

updating a database or the originating user device linking the translation if preferred by the receiving user to the code stream; and updating the database of the originating user device with results of the reverse translation process, search result entry rankings, and indications made by the originating user about the results of the reverse translation process.

8. The multiple language translation method of claim 7, each word code comprising a language code, a number code, and a grammar code.

9. The multiple language translation method of claim 8, the language code indication language used, the number code indicating a word, and the grammar code indicating grammatical usage of the word.

10. The multiple language translation method of claim 7; where each word code comprises numbers that represent base language letters.

11. The multiple language translation method of claim 10, where a base language is English and A equals 1, B equals 2, C equals 3, D equals 4, E equals 5, F equals 6, G equals 7, H equals 8, I equals 9, J equals 10, K equals 11, L equals 12, M equals 13, N equals 14, O equals 15, P equals 16, Q equals 17, R equals 18, S equals 19, T equals 20, U equals 21, V equals 22, W equals 23, X equals 24, Y equals 25, and Z equals 26.

12. The multiple language translation method of claim 7, where the original language input comprises text, speech, captured image, viewfinder image, scanned image, or scanned text.

13. The multiple language translation method of claim 7, further comprising:

receiving a confirmation that the original language input is correct before translating the original language input into base language text.

14. A multiple language translation method being implemented in a computer system having a processor and a non-transitory memory, the method comprising:

receiving an original language input from an originating user;

translating the original language input into base language text;

converting the base language text into at least one word code;

determining at least one target language word using the at least one word code;

searching via internet for the at least one target language word;

ranking search result entries based on popularity of usage;

selecting a search result entry from search results based on ranking of search result entries;

performing a reverse translation process on the selected search result entry to translate the selected search result entry back into a language of the original language input;

presenting result of the reverse translation process to the originating user in the language of the original language input;

receiving an indication from the originating user that the result of the reverse translation process is correct;

selecting another search result entry from the search results if the originating user indicates that the result of the reverse translation process is not correct;

performing the reverse translation process and presenting the result of the reverse translation process to the originating user until the originating user indicates that the result of the reverse translation process is correct;

sending the translation from an originating user device to a receiving user device when the originating user indicates that the result of the reverse translation process is correct;

presenting the translation of the code stream that the originating user indicated was correct to the receiving user on the receiving user device;

selecting the translation if preferred by the receiving user at the receiving user device;

sending the translation if preferred by the receiving user to the originating user device;

updating a database of the originating user device linking the translation if preferred by the receiving user to the code stream; and updating the database of the originating user device with results of the reverse translation process, search result entry rankings, and indications made by the originating user about the results of the reverse translation process.

15. The multiple language translation method of claim 14, each word code comprising a language code, a number code, and a grammar code.

16. The multiple language translation method of claim 15, the language code indication language used, the number code indicating a word, and the grammar code indicating grammatical usage of the word.

17. The multiple language translation method of claim 14, where each word code comprises numbers that represent base language letters.

18. The multiple language translation method of claim 17, where a base language is English and A equals 1, B equals 2, C equals 3, D equals 4, E equals 5, F equals 6, G equals 7, H equals 8, I equals 9, J equals 10, K equals 11, L equals 12, M equals 13, N equals 14, O equals 15, P equals 16, Q equals 17, R equals 18, S equals 19, T equals 20, U equals 21, V equals 22, W equals 23, X equals 24, Y equals 25, and Z equals 26.

19. The multiple language translation method of claim 14, where the original language input comprises text, speech, captured image, viewfinder image, scanned image, or scanned text.

20. The multiple language translation method of claim 14, further comprising:
   receiving a confirmation that the original language input is correct before translating the original language input into base language text.

* * * * *